United States Patent [19]
Crane, Jr. et al.

[11] Patent Number: 5,781,408
[45] Date of Patent: Jul. 14, 1998

[54] COMPUTER SYSTEM HAVING A MOTORIZED DOOR MECHANISM

[75] Inventors: Stanford W. Crane, Jr.; Maria M. Portuondo, both of Boca Raton, Fla.; Edward V. Cruz, Newbury Park, Calif.; Vincent R. Razo, Granada Hills, Calif.; Shaun Fynn, West Hollywood, Calif.

[73] Assignee: The Panda Project, Boca Raton, Fla.

[21] Appl. No.: 685,547

[22] Filed: Jul. 24, 1996

Related U.S. Application Data

[62] Division of Ser. No. 237,366, May 3, 1994, Pat. No. 5,576,931.

[51] Int. Cl.$^6$ .................................................. H05K 5/00
[52] U.S. Cl. ...................... 361/683; 361/724; D14/100
[58] Field of Search ...................... 361/683, 724–727, 361/679, 684–686; 116/77, 85, 86; 312/223.1–223.3; 49/404; D25/48; D14/100–102, 109; 318/10

[56] References Cited

U.S. PATENT DOCUMENTS

| | | | |
|---|---|---|---|
| 3,337,838 | 8/1967 | Damiano et al. | 339/217 |
| 3,366,915 | 1/1968 | Miller | 339/19 |
| 3,444,506 | 5/1969 | Wedekind | 339/99 |
| 3,903,404 | 9/1975 | Beall et al. | 361/687 |
| 4,487,463 | 12/1984 | Tillotson | 339/17 |
| 4,572,604 | 2/1986 | Ammon et al. | 339/176 |
| 4,616,406 | 10/1986 | Brown | 29/588 |
| 4,655,526 | 4/1987 | Shaffer | 339/74 |
| 4,672,773 | 6/1987 | Bilt | 49/358 |
| 4,698,663 | 10/1987 | Sugimoto et al. | 357/81 |
| 4,734,042 | 3/1988 | Martens et al. | 439/62 |

(List continued on next page.)

FOREIGN PATENT DOCUMENTS

| | | |
|---|---|---|
| 0 467 698 | 1/1992 | European Pat. Off. |
| 3737819A1 | 5/1988 | Germany |
| WO 88/01127 | 2/1988 | WIPO |

OTHER PUBLICATIONS

George D. Gregoire, "3–Dimensional Circuitry Solves Fine Pitch SMT Device Assembly Problem," Connection Technology.

Dimensional Circuits Corporation, "Dimensional Circuits Corp. Awarded Two U.S. Patents," D.C.C. News, Apr. 5, 1994.

George D. Gregoire, "Very Fine Line Recessed Circuitry—A New PCB Fabrication Process".

Barnhouse, "Bifurcated Through–Hole Technology—An Innovative Solution to Micro–Strip Interconnection System," AMP Product Guide, pp. 3413–3414, Jun., 1991.

"Rib–Cage II Through–Mount Shrouded Headers" and Micropax Board–to–Board Interconnect System, Du Pont Connector Systems Product Catalog A, pp. 2–6, 3–0, 3–1, Feb., 1992.

"AMP–ASC Interconnection Systems", AMP Incorporated, Product Information Bulletin, pp. 1–4, copyright 1991.

IBM Technical Disclosure Bulletin, "Segmented Cooling for Personal Computers," vol. 36, No. 10, pp. 431–434, Oct. 1993.

IBM Technical Disclosure Bulletin, "Coding Electrical Equipment," vol. 20, No. 6, pp. 2428–2429, Nov., 1977.

*Primary Examiner*—Leo P. Picard
*Assistant Examiner*—Jayprakash N. Gandhi
*Attorney, Agent, or Firm*—Morgan, Lewis & Bockius LLP

[57] ABSTRACT

A computer system includes an exterior casing having an opening therein to permit user access to peripheral devices, such as floppy drives, CD ROM drives, tape drives, or optical drives. A door driven by a reversible motor slides along the exterior casing to open and close the opening in the exterior casing. A user may activate a sensor provided on the exterior casing to selectively open or close the door. The sensor may be a light-sensitive sensor, a voice-activated sensor, or a proximity sensor. Alternatively or in addition, the user may open and close the door via a system processor, for example, by entering commands via a keyboard. The door may slide along tracks within the exterior casing. In addition, the door may be locked in a closed position and unlocked to allow opening.

23 Claims, 32 Drawing Sheets

U.S. PATENT DOCUMENTS

| | | | |
|---|---|---|---|
| 4,748,540 | 5/1988 | Henneberg et al. | 361/687 |
| 4,897,055 | 1/1990 | Jurista et al. | 439/924 |
| 4,943,846 | 7/1990 | Shirling | 357/80 |
| 4,975,066 | 12/1990 | Sucheski et al. | 439/63 |
| 4,997,376 | 3/1991 | Buck et al. | 439/59 |
| 5,006,959 | 4/1991 | Freige et al. | 361/687 |
| 5,018,052 | 5/1991 | Ammon et al. | 361/683 |
| 5,037,311 | 8/1991 | Frankeny et al. | 439/66 |
| 5,071,363 | 12/1991 | Reylek et al. | 439/291 |
| 5,081,563 | 1/1992 | Feng et al. | 361/414 |
| 5,123,164 | 6/1992 | Shaheen et al. | 29/852 |
| 5,137,456 | 8/1992 | Dessai et al. | 439/66 |
| 5,216,579 | 6/1993 | Basara et al. | 361/683 |
| 5,281,151 | 1/1994 | Arima et al. | 439/68 |
| 5,309,024 | 5/1994 | Hirano | 257/773 |
| 5,326,936 | 7/1994 | Taniuchi et al. | 174/260 |
| 5,331,506 | 7/1994 | Nakajima | 361/686 X |
| 5,334,279 | 8/1994 | Gregoire | 156/630 |
| 5,342,393 | 8/1994 | Frei et al. | 174/266 |
| 5,351,393 | 10/1994 | Gregoire | 29/835 |
| 5,371,404 | 12/1994 | Juskey et al. | 257/659 |
| 5,376,825 | 12/1994 | Tukamoto et al. | 257/685 |
| 5,390,412 | 2/1995 | Gregoire | 29/848 |
| 5,473,507 | 12/1995 | Schwegier et al. | 361/690 |

COMPUTER SYSTEM HAVING A MOTORIZED DOOR MECHANISM

RELATED APPLICATIONS

This is a divisional of application Ser. No. 08/237,366 filed on May 3, 1994, U.S. Pat. No. 5,576,931.

The following patent applications are related to the present disclosure and are hereby expressly incorporated by reference:

1) U.S. appl. Ser. No. 07/983,083, now abandoned to Stanford W. Crane, Jr. entitled HIGH-DENSITY ELECTRICAL INTERCONNECT SYSTEM;

2) U.S. appl. Ser. No. 08/209,219 now abandoned to Stanford W. Crane, Jr. entitled HIGH-DENSITY ELECTRICAL INTERCONNECT SYSTEM;

3) U.S. appl. Ser. No. 08/208,586 to Stanford W. Crane, Jr. et al. entitled PREFABRICATED SEMICONDUCTOR CHIP CARRIER;

4) U.S. appl. Ser. No. 08/208,519 U.S. Pat. No. 5,543,586 to Stanford W. Crane, Jr. et al. entitled APPARATUS HAVING INNER LAYERS SUPPORTING SURFACE-MOUNT COMPONENTS;

5) U.S. appl. Ser. No. 08/208,691 U.S. Pat. No. 5,541,449 to Stanford W. Crane, Jr. et al. entitled SEMICONDUCTOR CHIP CARRIER AFFORDING A HIGH-DENSITY EXTERNAL INTERFACE;

6) U.S. appl. Ser. No. 29/019,780 U.S. Pat. No. D369,923 to Stanford W. Crane, Jr. et al. entitled CABINET EXTERIOR;

7) U.S. appl. Ser. No. 29/019,781 U.S. Pat. No. D363,707 to Stanford W. Crane, Jr. et al. entitled COMPUTER CABINET; and 8) U.S. appl. Ser. No. 08/208,877 now abandoned to Stanford W. Crane, Jr. et al. entitled MODULAR ARCHITECTURE FOR HIGH BANDWIDTH COMPUTERS.

BACKGROUND OF THE INVENTION

This application relates to a structure of a computer system, and specifically to an arrangement of elements in a computer system to facilitate cooling, use, access, and repair of the computer system.

As computers become smaller and as greater numbers of components are integrated within the casing of computers, the internal structure and layout becomes problematical. It is desirable to make computers having a small size. Yet, at the same time, as more components are added, servicing and upgrading become more difficult, while the cooling requirements of the computer may increase.

In conventional computers, the printed circuit boards (PCBS) that contain a Central Processing Unit (CPU) and its related electronics, as well as memories, and peripheral devices, such as hard disk drives and floppy disk drives, are housed in a single enclosure, devoid of internal partitions. All the elements that make up the computer reside in a single open area within the casing of the computer, containing only brackets necessary to support the components. There is generally no structure to effectively separate the internal elements from one another or to prevent heat and electromagnetic radiation generated by the components from affecting the other elements within the enclosure.

In addition, conventional computers are often not designed with ease of access for upgrade and repair. What is needed is a computer that is designed to facilitate cooling and that is designed so that its various components are easily accessible during upgrade and/or repair.

SUMMARY OF THE INVENTION

The present invention overcomes the problems and disadvantages of the prior art by incorporating structure that partitions the computer into a plurality of air circulation areas. The invention also includes components that act as an EMI shield. In addition, the invention allows peripherals to be moved into a position that facilitates access during installation of upgrades and during repair and also includes an automatically activated door for access to one or more of the peripherals.

In accordance with the purpose of the invention, as embodied and broadly described herein, the invention is a computer system, comprising: a power supply located in a first air circulation area of the computer system; first air circulating means for drawing air into the first air circulation area from outside the computer system at a front side of the power supply and out through the rear of the computer system; a peripheral device located in a second air circulation area of the computer system; an air intake that allows air from outside the computer system to enter the second air circulation area; a plurality of printed circuit boards substantially enclosed in a casing and located in a third air circulation area of the computer system; and second air circulating means for drawing air into the third air circulation area from outside the computer system and out through the top of the computer system.

In further accordance with the purpose of the invention, the invention is a computer system, comprising: a casing of the computer system; a power supply located proximate a bottom floor of the computer system; air intake means located in the casing at a front side of the power supply; a fan at a rear side of the power supply to draw air in from the air intake means and out through the rear of the computer system; a peripheral device area containing a peripheral, located above the power supply and surrounded by the casing; a support for the peripheral device, the support having an opening above and behind the air intake means allowing air from the air intake means to rise into the casing surrounding the peripheral device; a plurality of printed circuit boards substantially enclosed in a casing; an air baffle having an opening to the outside of the casing and an opening into a lower area of the casing enclosing the plurality of printed circuit boards; and a fan above the printed circuit boards to draw air in from the air baffle into the casing and out through the top of the computer system.

In further accordance with the purpose of the invention, the invention is a computer system having a door mechanism connected to an outer casing of the computer system and covering an opening in the casing, comprising: indicating means for allowing a user to indicate that the door should be moved; a door slidably connected to the casing, the door having an shape to correspond to an arc of the casing; and means, connected to the indicating means and to the door, for moving the door relative to the opening in the casing.

In further accordance with the purpose of the invention, the invention is a computer system, comprising: a peripheral device area containing a peripheral device; a casing of the computer system, enclosing the peripherals area, and having an opening therein; lattice support means for supporting the peripheral device, wherein the lattice support means allows the peripheral device supported by the support means to move forward and backward in a horizontal direction; and internal support means, attached to the lattice support means, for supporting the hinged lattice support means, wherein the hinged lattice support means allow the peripheral device to be moved forward sufficiently that a user can access a back portion of the peripheral device area.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

a. General Description

Figure 1:
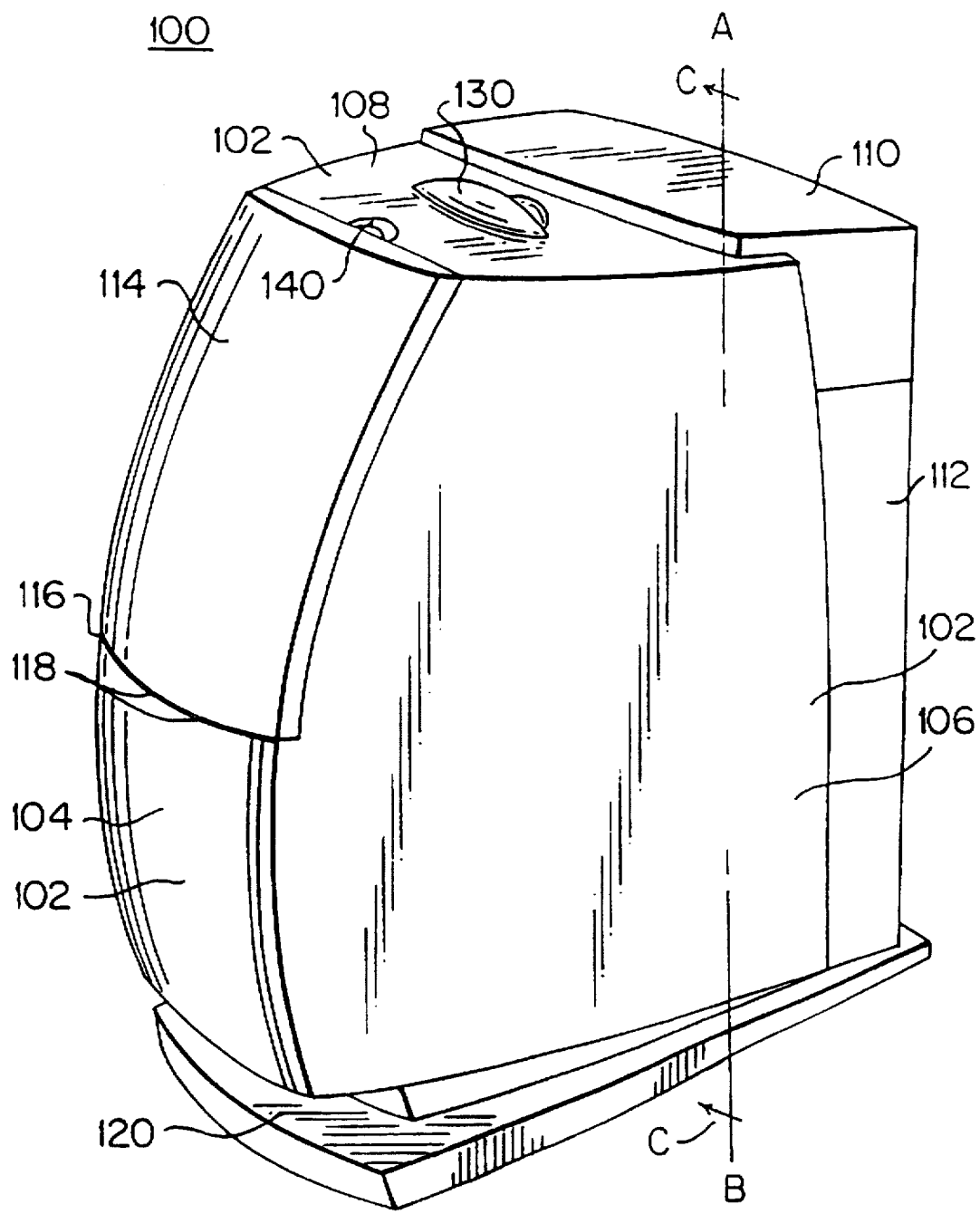
FIG. 1 is a perspective front view of a computer system in accordance with the present invention, including an exterior casing and a door in a closed position.

FIG. 1 is a perspective front view of a computer system 100 in accordance with the present invention, including a door in a closed position. FIG. 1 shows a casing (also called an "exterior casing") 102, a cable cover 110, a door 114, and a cast aluminum base 120. Casing 102 includes a front part 104, side parts 106 and 107 (only 106 is shown in FIG. 1), and a top part 108. Casing 102 preferably is made of plastic, or a material such as Kevlar, which is a trademark of E.I. Du Pont De Nemours and Co. To prevent electromagnetic interference (EMI) from entering or leaving system 100, casing 102 has a wire mesh embedded therein. The wire mesh is preferably made of a metallic alloy of, e.g., copper, aluminum, or bronze. The wire mesh is of a grade of approximately 8×8 per square inch. Another embodiment of the present invention may omit the wire mesh if it is not needed to achieve a desired level of shielding. Front cover 104 of casing 102 may also be coated with electrically conductive paint, plated, or not treated with any special coating, depending on the EMI shielding requirements to be met.

FIG. 1 also shows a side 112 of a card cage containing PCBs. (An opposite side 113 is shown in FIG. 3). A slit 116 is located below door 114. LEDs 118 can be seen through slit 116. LEDs 118 are described further in connection with FIG. 2. FIG. 1 further shows a recessed handle 130 on top of the computer system 100, which aids in moving the computer system 100 and which also aids in removing exterior casing 102, and a sensor 140 for door 114.

Cable cover 110 serves to protect cables under the cover 110 by keeping dust out of the area. Cover 110 also protects the cables from physical interference, such as being accidently disconnected.

Figure 2:
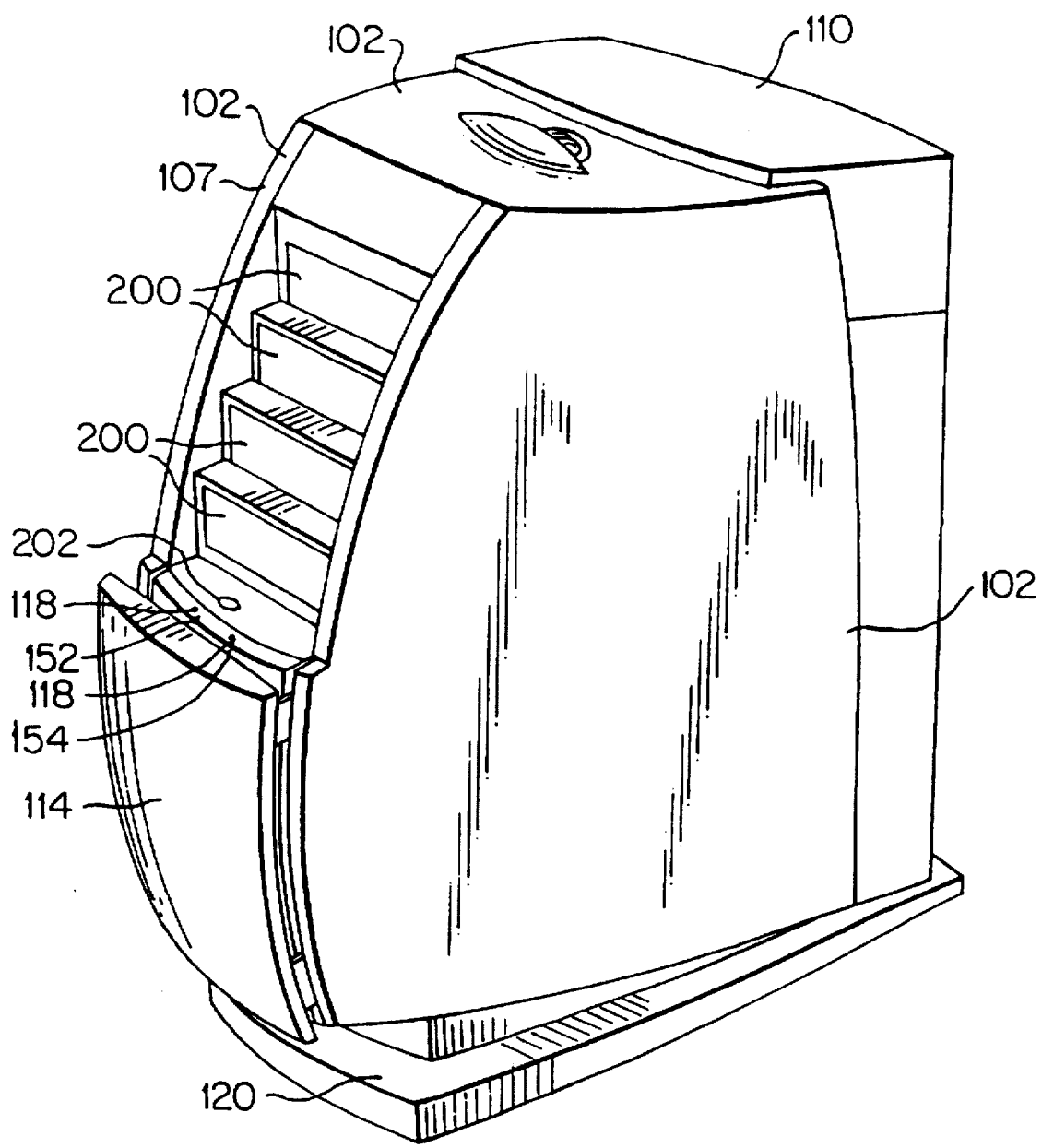
FIG. 2 is a perspective front view of the computer system of FIG. 1, showing the door in an open position.
Figure 3:
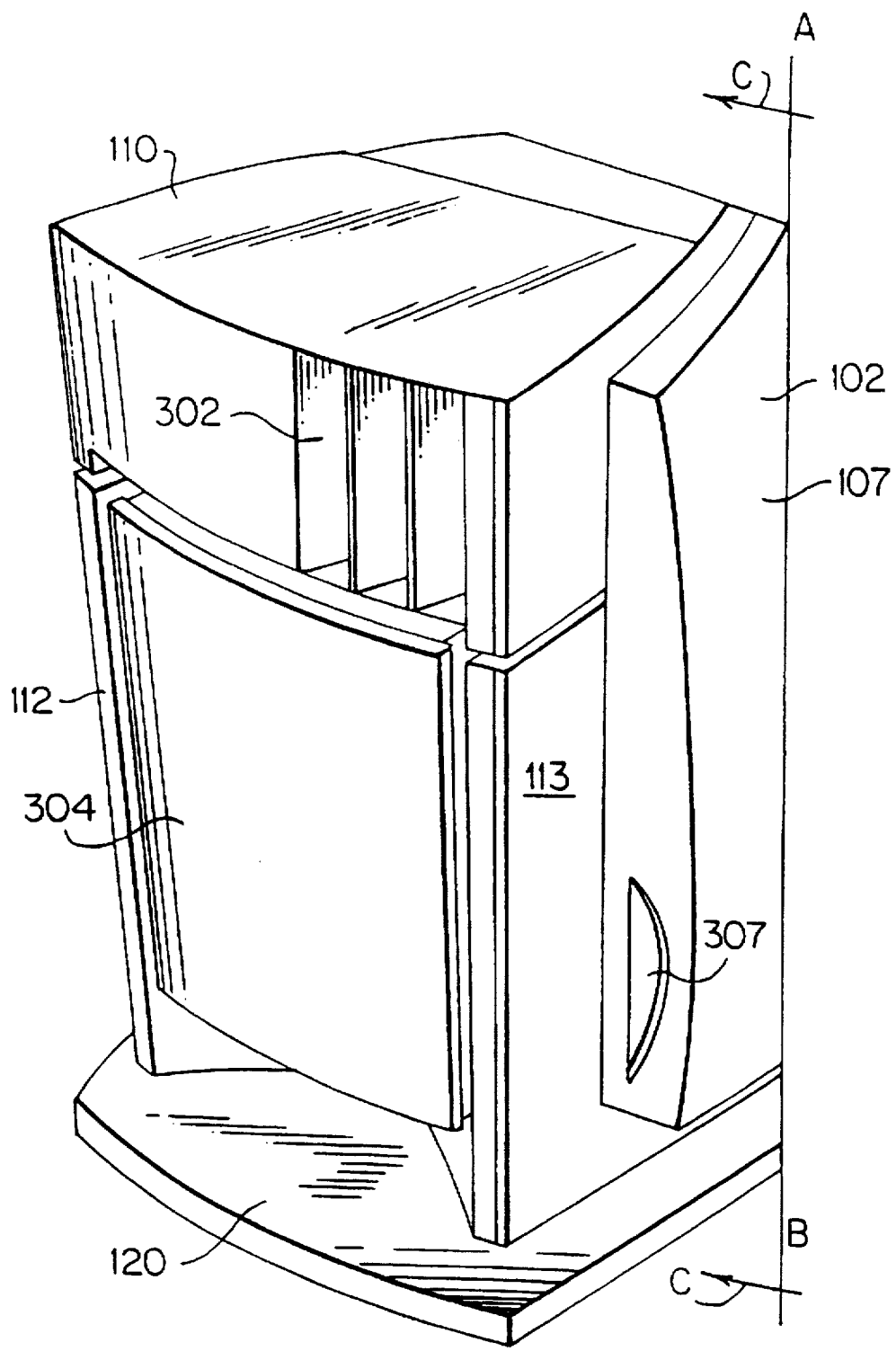
FIG. 3 is a partial perspective back view of the computer system of FIG. 1 cut along a line AB of FIG. 1.

FIG. 2 is a perspective front view of the computer system of FIG. 1, showing door 114 in an open position. The operation of door 114 is described in detail below in connection with FIGS. 20–24. Door 114 opens to reveal a plurality of externally accessible peripheral devices 200. Peripheral devices 200 can be any combination of floppy drives, CD ROM drives, tape drives, and optical drives in a number of different sizes and heights. FIG. 2 also shows a reset button 202, which causes the computer system 100 to perform a reset operation when reset button 202 is pressed.

FIG. 2 also shows LEDs 118. The LEDs include an OFF/ON indicator 152, which indicates whether computer system 100 is turned on or off. LEDs 118 further include a "drive activity indicator," which indicates whether one or more of the peripheral devices 200 (or other devices not shown in FIG. 2) are accessing data.

FIG. 3 is a partial perspective back view of the computer system of FIG. 1 cut along the line AB of FIG. 1 in a direction of arrows C. FIG. 3 shows vents 302 in cable cover 110. The purpose of vents 302 will be discussed below. A back cover 304 is attached to side wall 112 and a side wall 113. Side casing parts 106 (not shown) and 107 have respective vents 306 (not shown) and 307.

Figure 4:
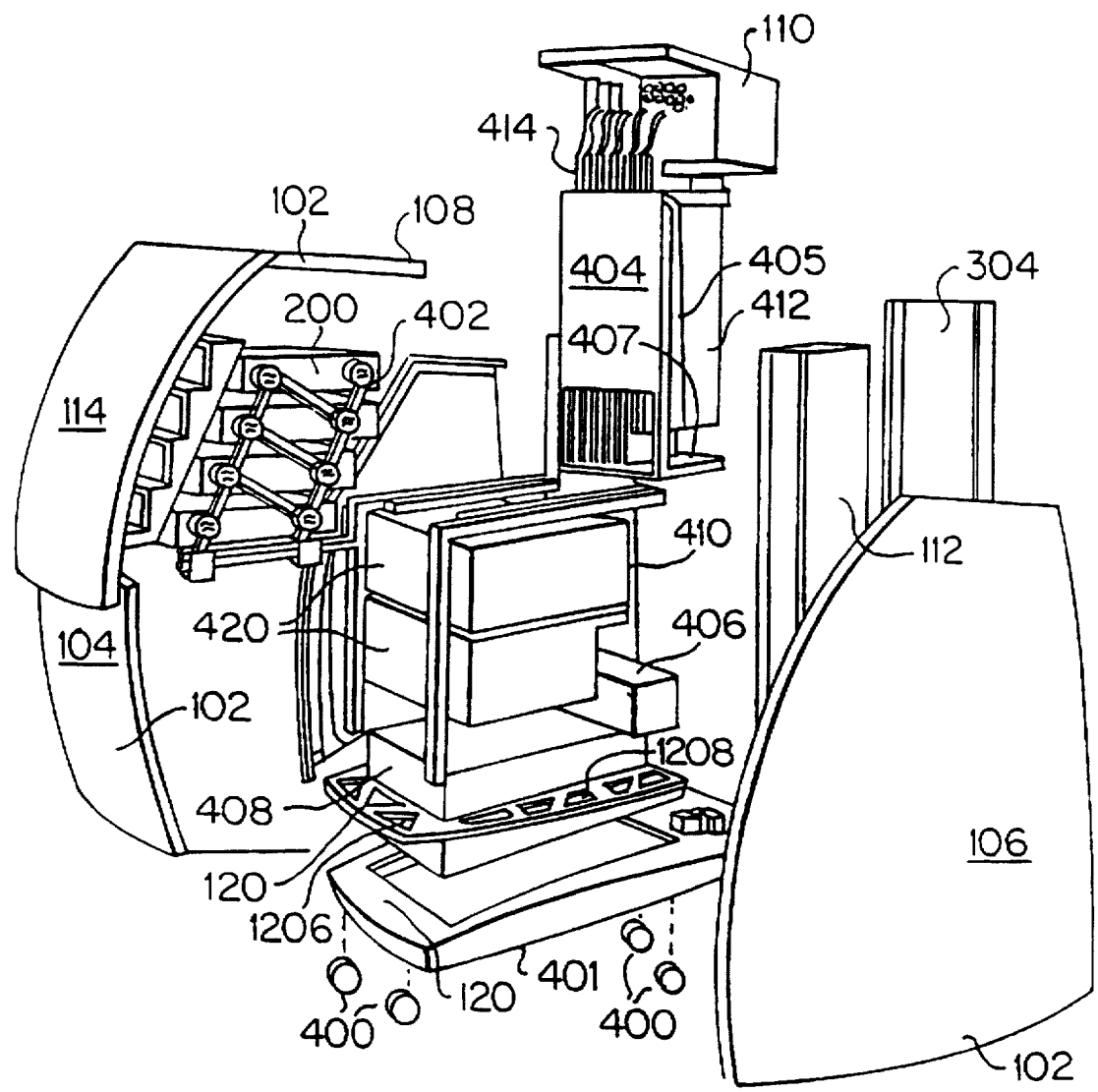
FIG. 4 is an exploded view of the computer system of FIG. 1.

FIG. 4 is an exploded view of the computer system of FIG. 1. FIG. 4 includes a plurality of wheels 400, which are affixed to a bottom surface 401 of base 120. Externally accessible peripheral devices 200 are supported by a peripheral device frame 402. Frame 402 includes two lattice-shaped sides. Thus, frame 402 is light-weight and yet rigid enough to support peripherals 200. A same lattice structure preferably is used to support both sides of peripherals 200, but in another embodiment only one support may have a lattice structure.

System 100 includes a card cage air inlet 406 and a corresponding card cage air inlet (not shown) on an opposite side of the system 100. FIG. 4 also shows a back 404 of the card cage. A backplane 405 is attached to card cage back 404 and has connectors, or other means, for attaching PCBs 412 to backplane 405. A power supply 408 is positioned in connection with base 120. Base 120 has vents 1206 and 1208. As shown in, e.g., FIGS. 4 and 12, these vents may be of any suitable number and shape.

A internal device bracket 410 is used to mount internal peripheral devices 420 as described below. Internal peripheral devices can be, for example, hard disk drives of various heights and sizes. For example, internal peripheral devices 420 may be 3.5 half height drives, 3.5 inch one inch height drives, 5.25 half height drives, or 5.25 full height drives. A plurality of I/O connectors 414 are in electrical contact with PCBs 412.

Figure 5:
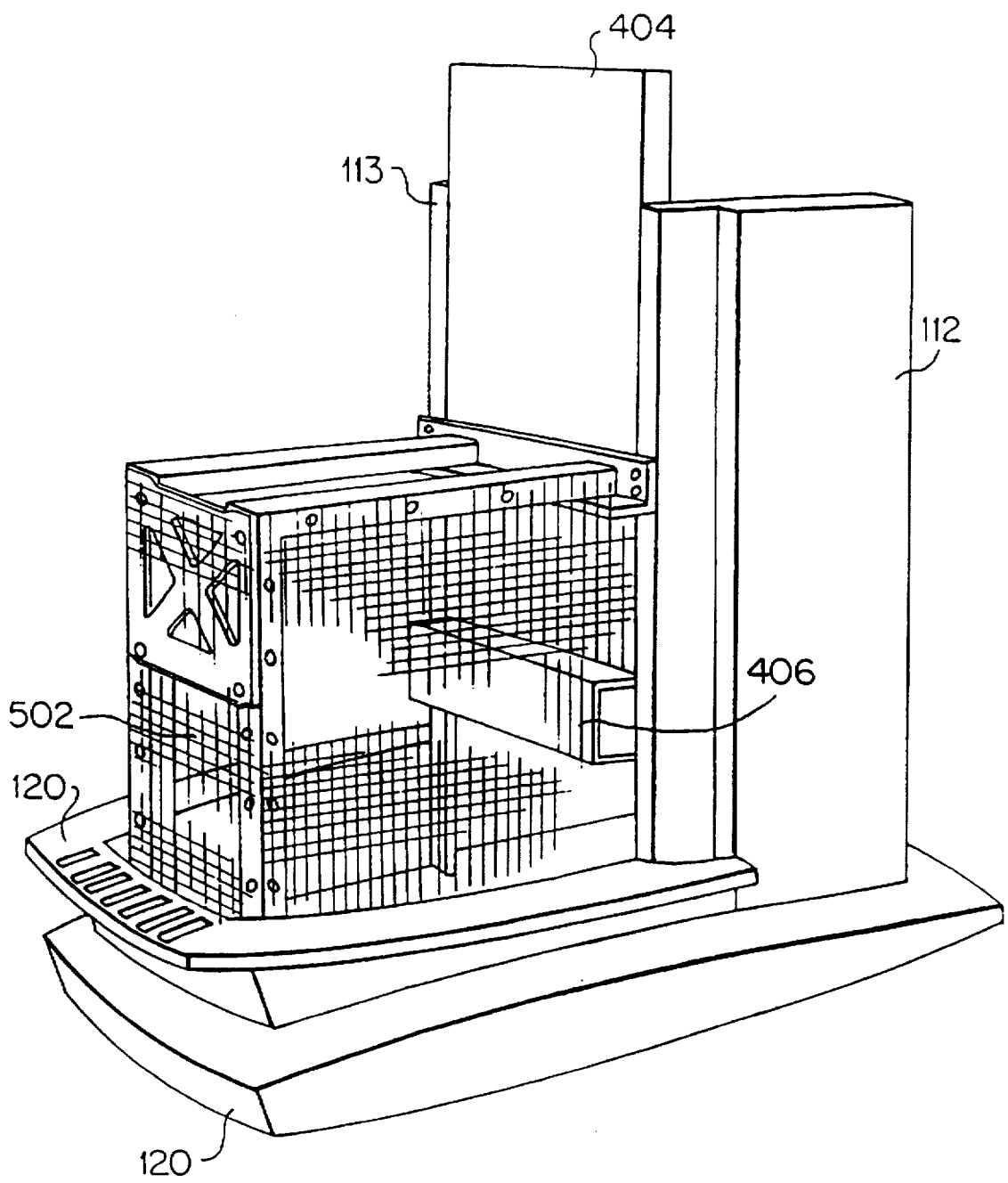
FIG. 5 is a perspective front view of the computer system of FIG. 1 showing a wire mesh enclosing peripherals of the system.

FIG. 5 is a perspective front view of the computer system 100 of FIG. 1 showing a wire mesh cage 502 enclosing internal peripherals 420 of the system. Wire mesh cage 502, which preferably is made of bronze or copper alloy, aluminum, or other metal, surrounds internal peripherals 420 to protect them from EMI. Mesh cage 502 is in close contact with the frame supporting the peripherals and with base 120, thus providing a solid ground for emitted signals. Mesh Cage 502 may also surround external drives 200.

Figure 6:
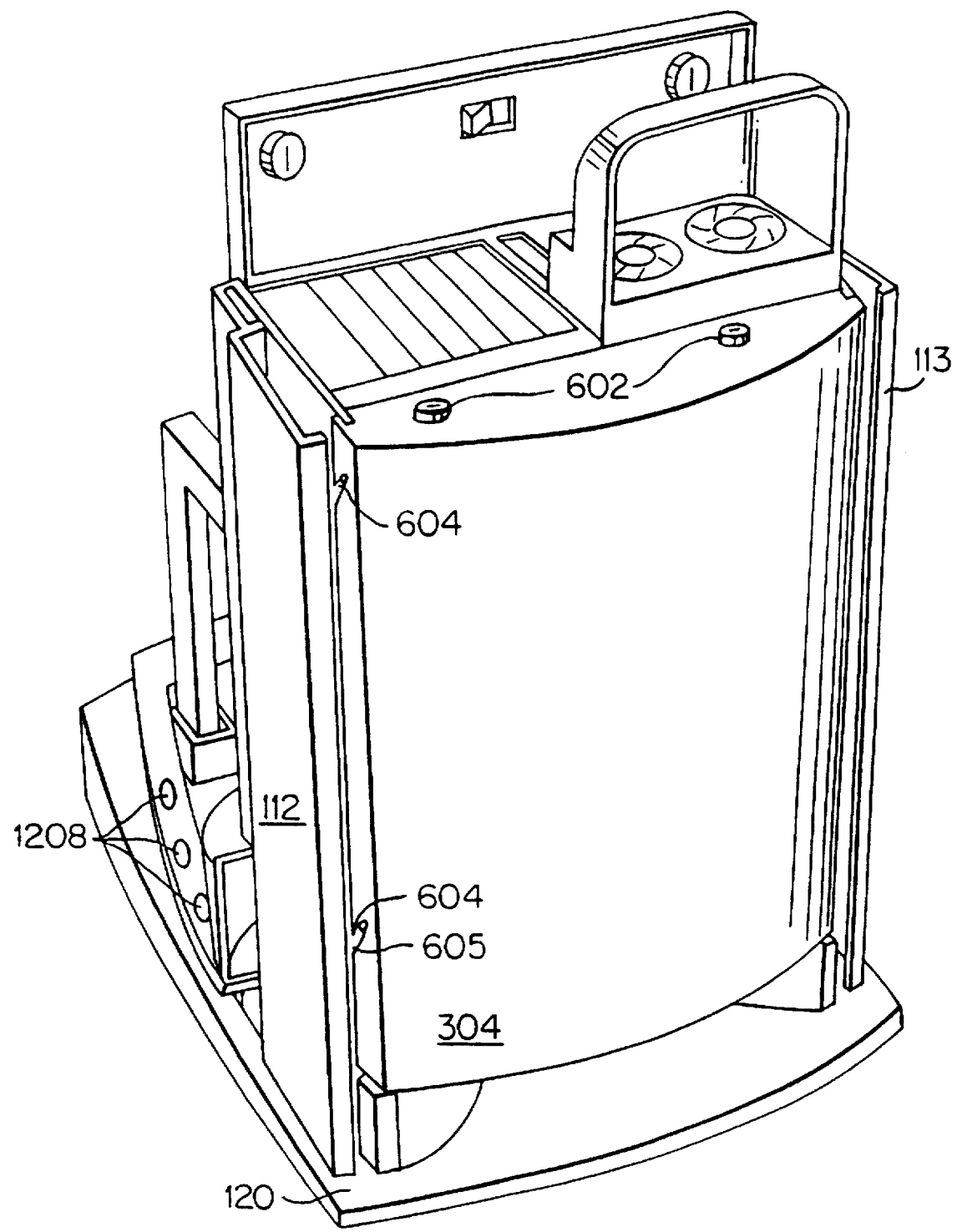
FIG. 6 shows a perspective back view of the computer system of FIG. 1 with the casing and cable cover removed.

FIG. 6 shows a perspective back view of the computer system of FIG. 1 with the casing 102 and cable cover 110 removed. FIG. 6 shows back cover 304, which is secured with two quick turn fasteners 602 on the top. Fasteners 602 may also be key locks, captive screws, quarter turn screws, or the like. Back cover 304 wraps around the side of the card cage. Pins 604 located on the side of the card cage slide into angled slots 605 formed on the side of back cover 304 to secure back cover 304 in place. Angled slots 605 eliminate a need for hinges of back cover 304. This arrangement makes back cover 304 easy to remove and replace, but provides a solid connection between the card cage and back cover 304 for EMI shielding.

Figure 7:
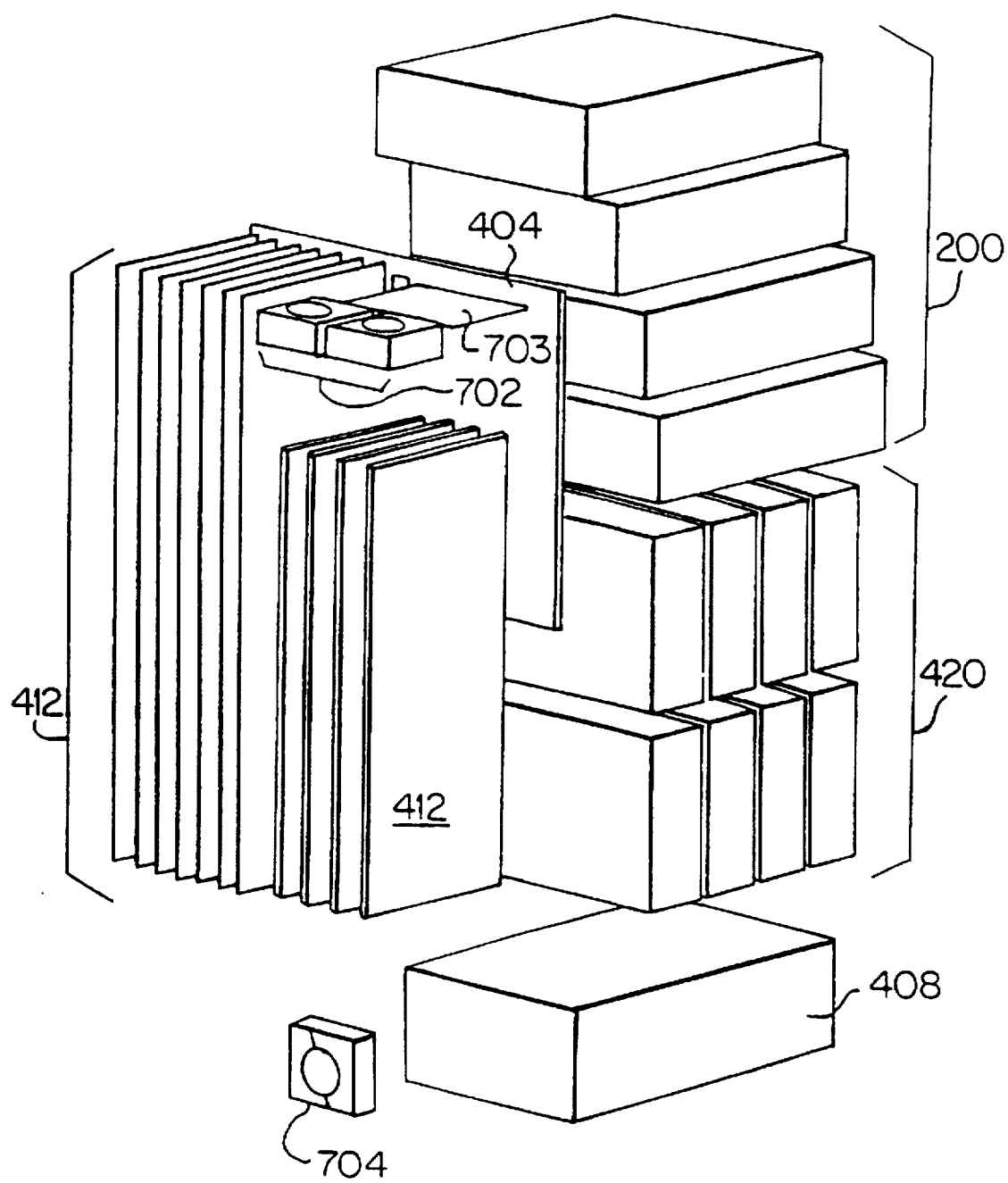
FIG. 7 is a simplified perspective back view of internal elements of the computer system of FIG. 1.

FIG. 7 is a simplified perspective back view of internal elements of the computer system of FIG. 1. Power supply 408 is positioned below internal peripheral devices 420, which are in turn positioned below externally accessible peripheral devices 200. The internal peripheral devices 420 and the externally accessible peripheral devices 200 are positioned toward front side 104 of casing 102 (not shown). PCBs 412 are positioned in a card cage of system 100. It should be understood that, although FIG. 7 shows eleven PCBs, any number of PCBs may be included in a computer system in accordance with the present invention. At least one I/O control board 703 may be connected to backplane 405.

As shown in the Figure, a plurality of fans 702 blow air away from PCBs 412 and out of the system 100. A fan 704 is positioned toward a back side of power supply 408 in such a way that fan 704 blows air away from power supply 408 and out of the system.

b. The Printed Circuit Boards and the Card Case

Figure 8:
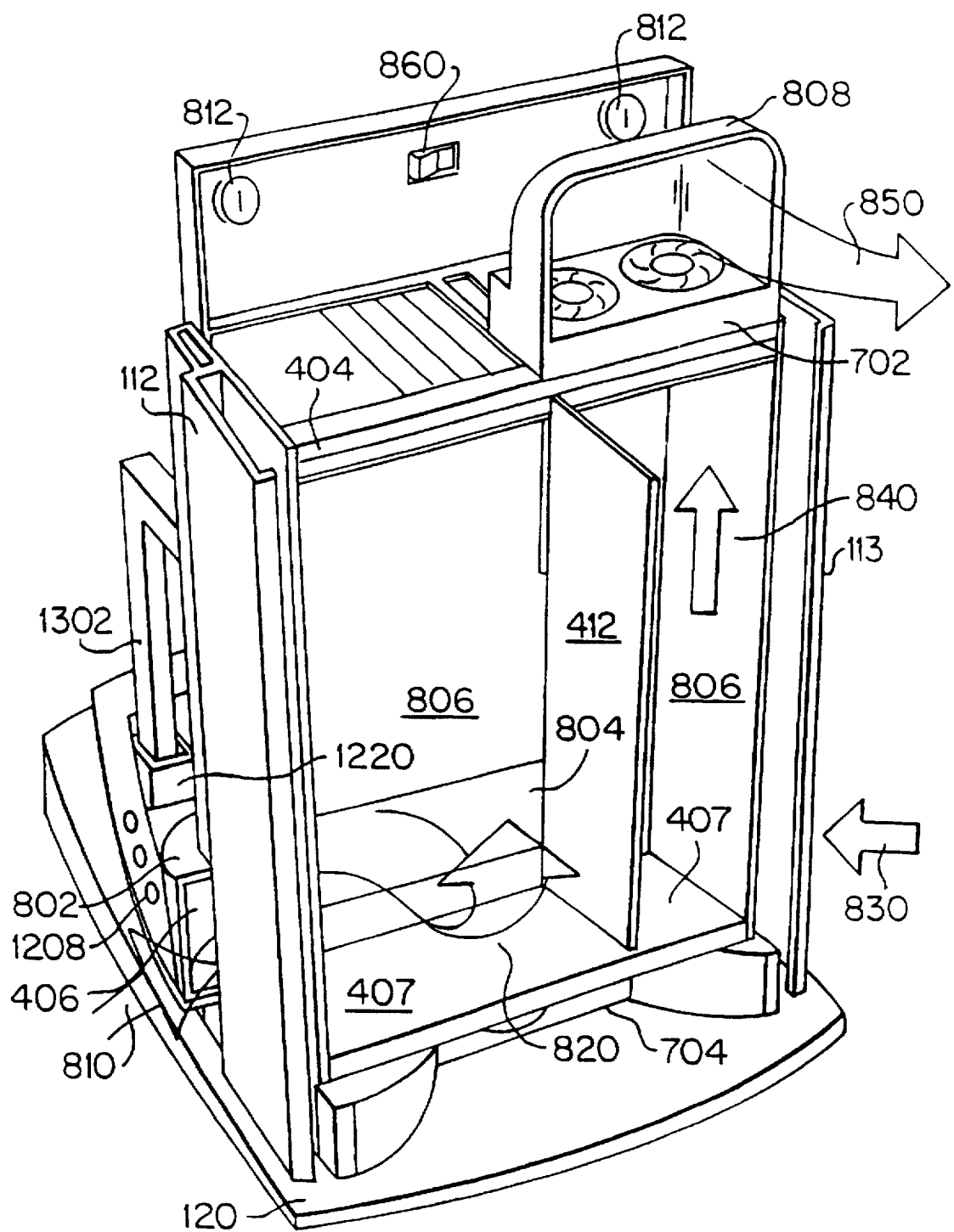
FIG. 8 is a perspective back view of the computer system showing air circulation for printed circuit boards.

FIG. 8 is a perspective back view of the computer system. FIG. 8 shows air circulation for PCBs 412 with casing 102, cable cover 110, and back 304 removed. Air circulating over PCBs 412 acts to cool the PCBS. A single PCB 412 is shown in FIG. 8 for clarity of explanation. It is understood that PCBs 412 are attached to backplane 405 (also not shown for clarity). PCBs 412 are located in an air circulation area (also called a "card cage enclosure") 806. PCBs 412 preferably are arranged vertically so that hot air generated by the electronic components on the PCBs naturally rises to the top of the card cage enclosure 806 and is drawn out by fans 702 located at the top of the enclosure, although other arrangements may also be used.

Card cage enclosure 806 is designed to provide shielding against electromagnetic radiation, which can create EMI, that may be generated by the PCBs and to shield against electromagnetic radiation that may enter the card cage enclosure 806 from an external source. The card cage back 404 and card cage sides 112 and 113 preferably are made of aluminum. Open areas are covered with a screen of bronze alloy, copper alloy, aluminum, or some other metallic alloy to allow for ample air exhaust, thus providing an enclosure "sealed" against EMI. Card cage enclosure 806 preferably is grounded by screws that connect it to base 120.

To cool PCBs 412, air is drawn from outside the system through an air baffle 802 and into circulation area 806 by plurality of fans 702. A bottom floor of card cage 407 prevents hot air from the power supply from entering card cage enclosure 802. Air baffle 802 connects to air vent 307 (FIG. 3) so that air is drawn only into the card cage by fans 702 and not into the drive area. Fans 702 are located above PCBs 412. From baffle 802, the air passes into air circulation area 806 through an opening 804 in a portion of card cage back 404. An initial direction of air flow into air baffle 802 is indicated by an arrow 810. The air is drawn through opening 804, past the vertically oriented PCBs, as indicated by an arrows 820 and 840, and out through a fan hood 808, as indicated by an arrow 850.

Figure 9:
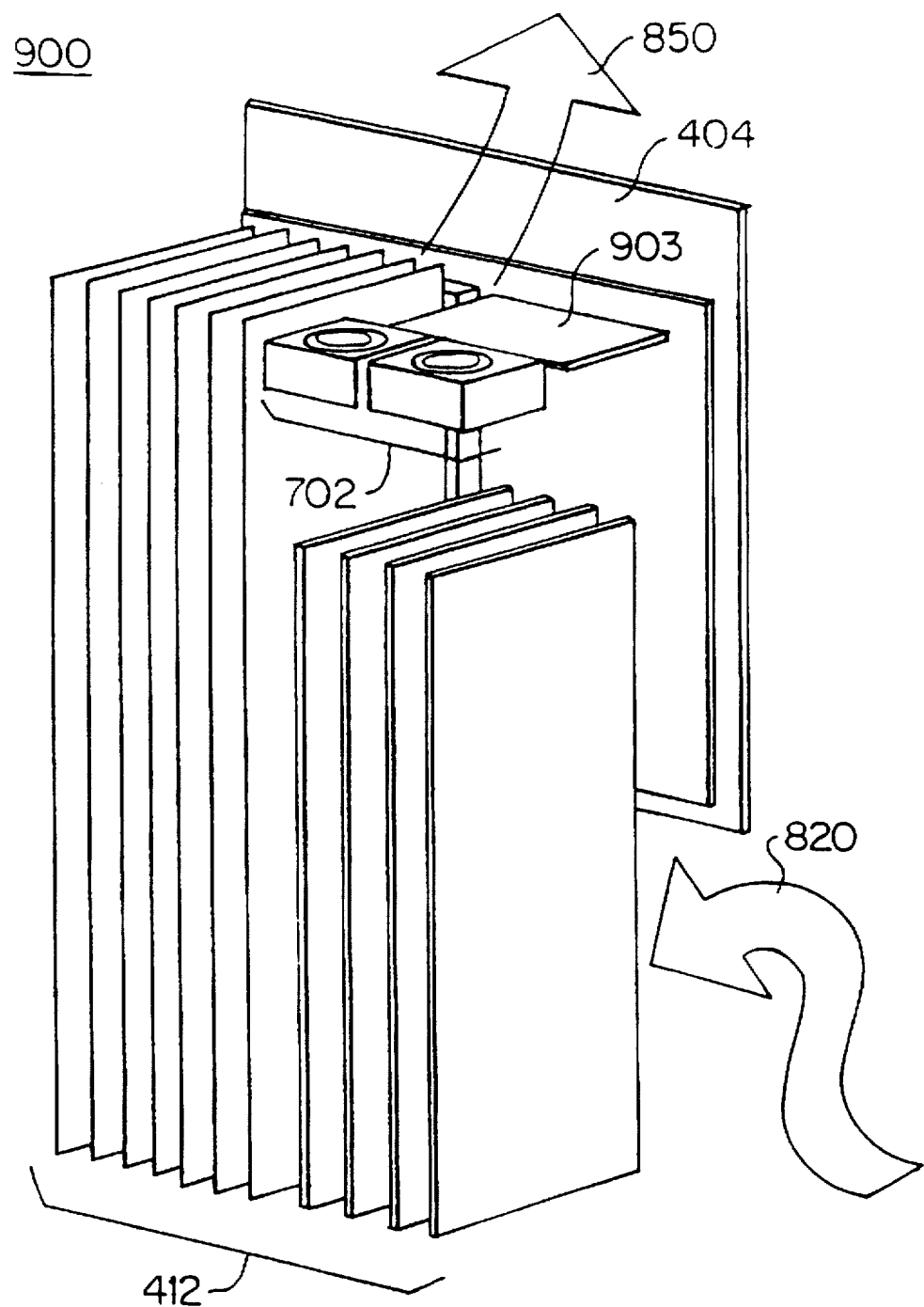
FIG. 9 is a perspective back view of the computer system showing air circulation for the printed circuit boards of FIG. 7.

FIG. 9 is a perspective back view of the computer system showing air circulation for PCBs 412 of FIG. 7. As indicated by arrow 820, air is drawn past PCBs 412 by fans 702. As indicated by arrow 850, fans 702 draw the air outside of the casing. Card cage back 404 acts as a partition to channel the flow of air past PCBs 412. Casing 102 and card cage back 404 separate air circulation area 806 from the rest of the computer system.

Figure 10:
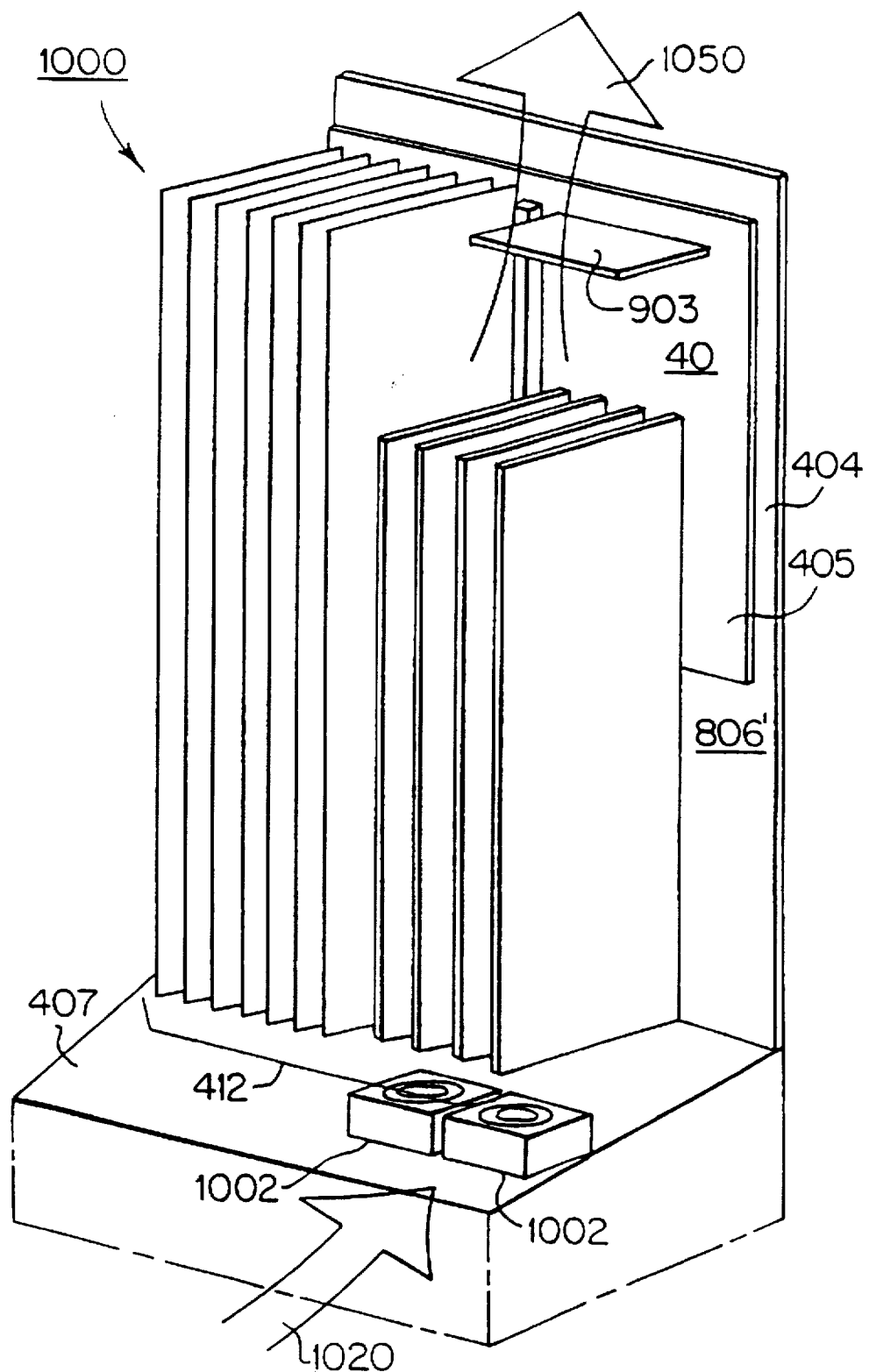
FIG. 10 is a perspective back view of the computer system showing an alternate pattern of air circulation for printed circuit boards.

FIG. 10 is a perspective back view of the computer system showing an alternate pattern of air circulation for PCBs 412. PCBs 412 are attached to backplane 405, and are located in an air circulation area 806'.

To cool PCBs 412, air is drawn through vents on the card cage floor 407 below fans 1002 into the card cage by a plurality of fans 1002. Fans 1002 are located below PCBs 412 but above card cage floor 407. An initial direction of air flow into the card cage is indicated by an arrow 1020. The air then rises past the vertically oriented PCBs, and to the exterior of the system, as indicated by an arrow 1050.

Figure 11:
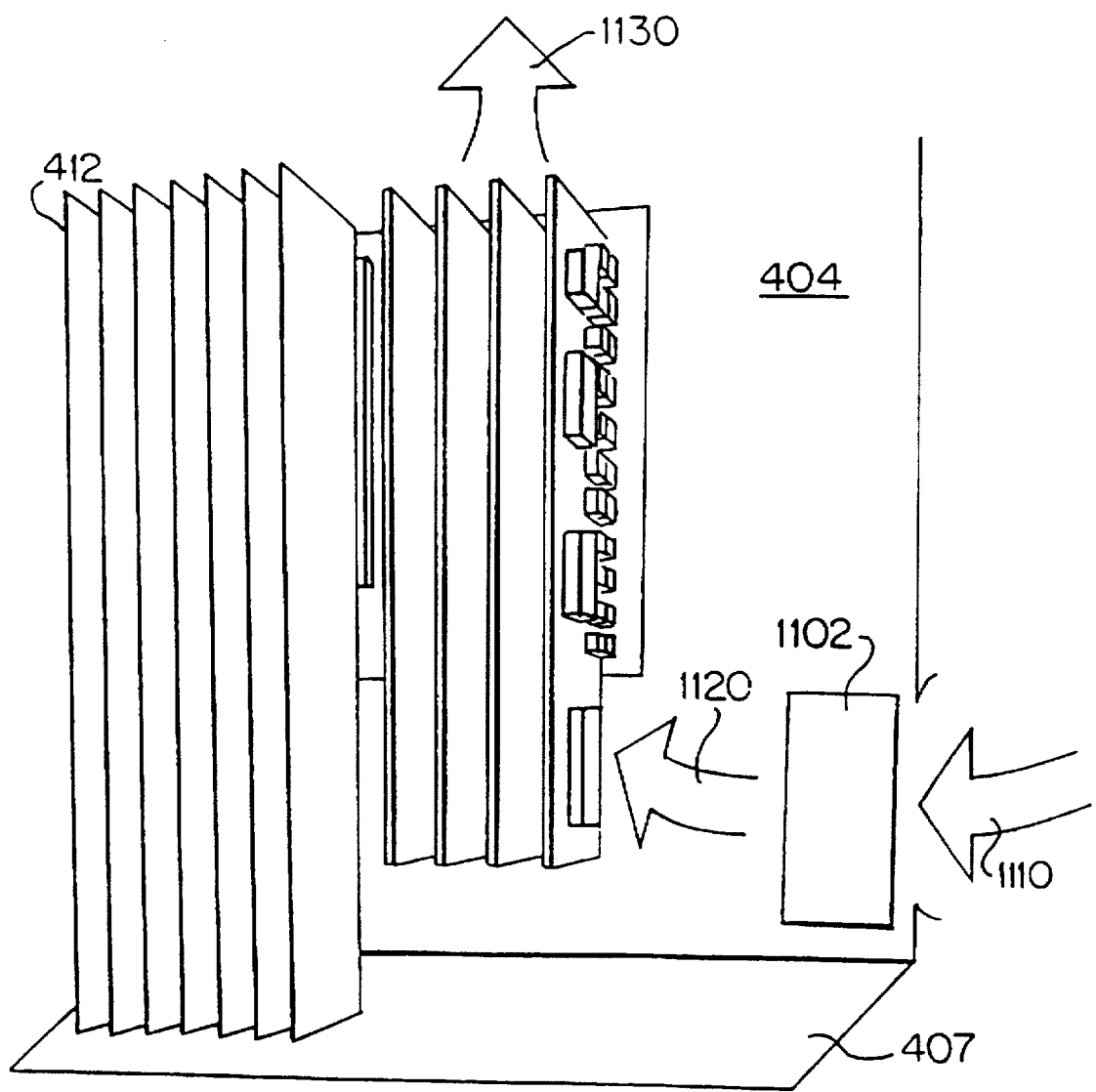
FIG. 11 is a perspective back view of the computer system showing an alternate pattern of air circulation for printed circuit boards.

FIG. 11 is a perspective back view of the computer system showing an alternate pattern of air circulation for printed circuit boards. In FIG. 11, a fan 1102 is located on a side of casing 102, preferably near the hottest components on PCBs 412, e.g., a processor. Fan 1102 pulls air in through vents (not shown) on the side of casing 102, as indicated by arrows 1110 and 1120. The hot air rises and exits through vents (not shown) above PCBs 412, as indicated by arrow 1130.

c. The Power Supply

Figure 12:
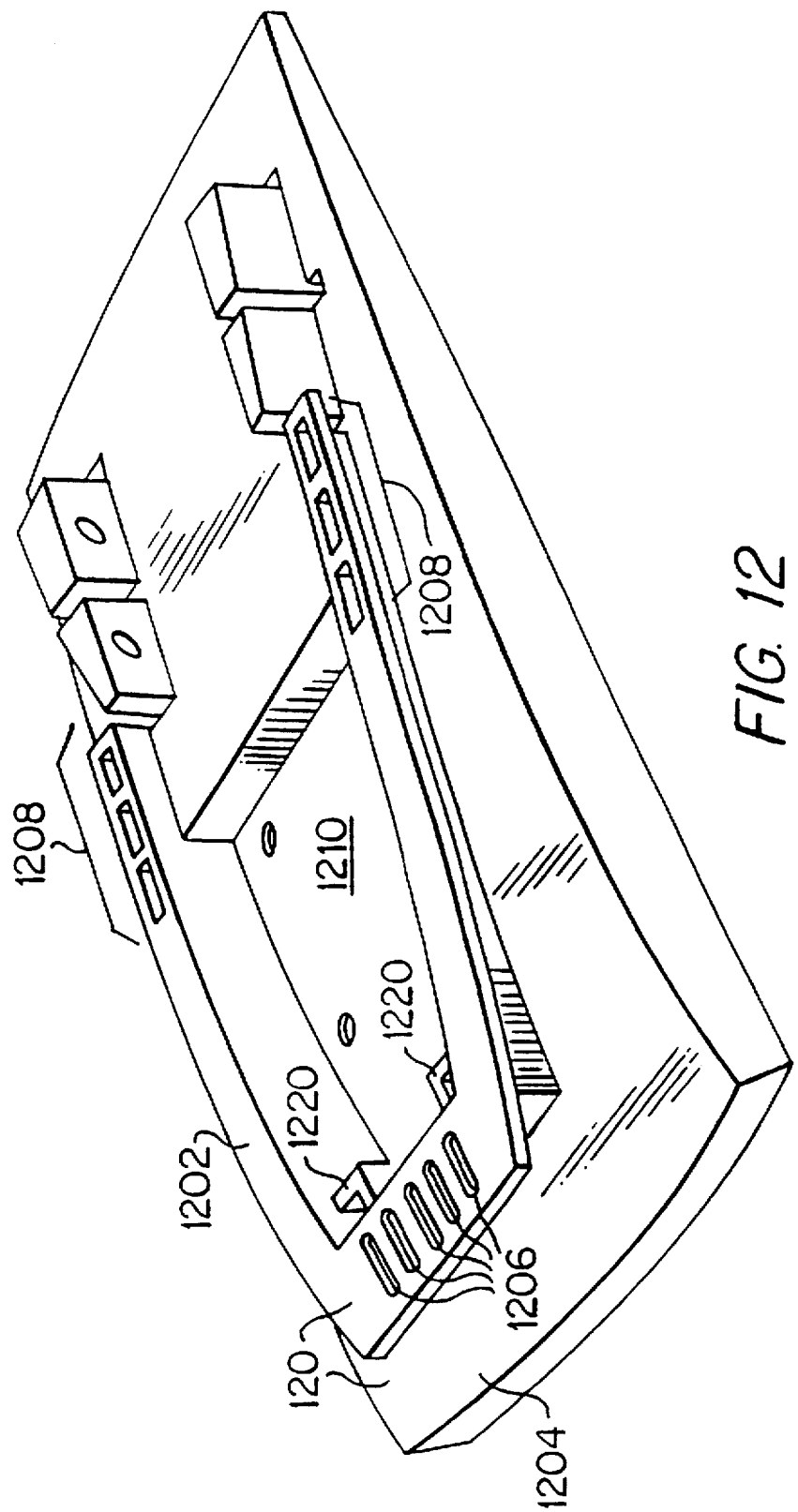
FIG. 12 is a perspective top view of a base of the computer system.

FIG. 12 is a perspective top view of base 120 of computer system 100. Base 120 includes a top portion 1202 and a bottom portion 1204. The top and bottom portions of the base preferably are formed as a unitary component, but, in another embodiment, are formed separately. Top portion 1202 includes a plurality of vents 1206 and a plurality of vents 1208. Vents 1206, and all other intake vents, are elevated from the ground. Such elevation helps to prevent particulate matter, e.g., dust from a floor, from entering the system 100. In other embodiments, vents 1206 and 1208 have wider or narrower openings or different numbers of openings than are shown in the Figure.

Power supply 408 (not shown) rests in indentation 1210 and is fastened to base 120 using any appropriate type of fastener, such as glue, nails, screws, etc. Base 120 also includes square braces 1220, the purpose of which is discussed below in connection with, e.g., FIGS. 13 and 17.

Figure 13:
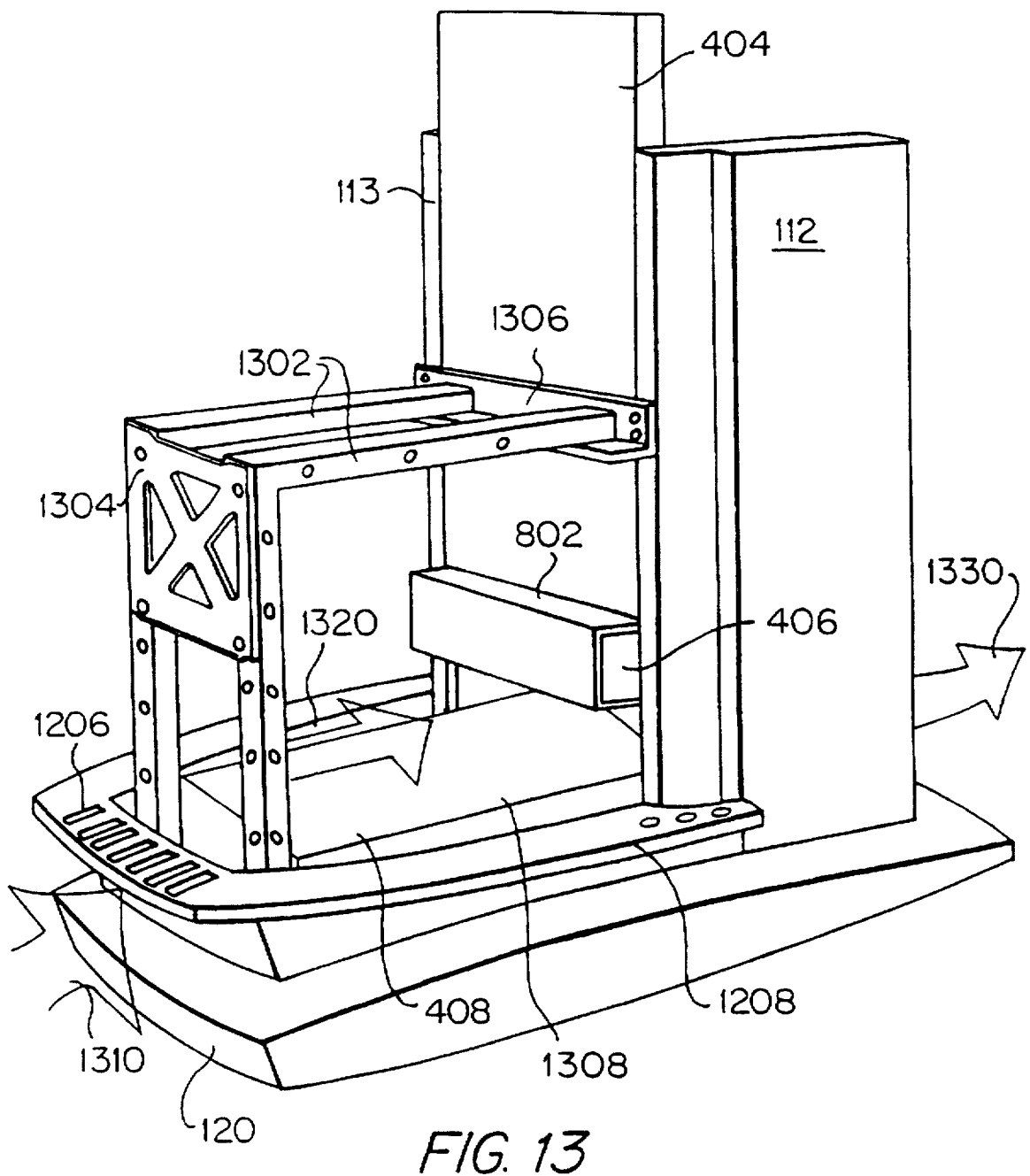
FIG. 13 is a perspective front view of the computer system showing air circulation for a power supply.

FIG. 13 is a perspective front view of the computer system showing air circulation near power supply 408. Power supply 408 is located in an air circulation area 1308 defined by indentation 1210 of base 120 and the lower portion of internal peripherals 420 (not shown). To cool power supply 408, air is drawn into vents 1206 of base 120 by fan 704, as indicated by an arrow 1310. Fan 704 is located behind power supply 408 (see FIG. 7). The air then passes into an air circulation area 1308. The air is drawn over power supply 408, as indicated by an arrow 1320, and out the back of the system through fan 704, as indicated by an arrow 1330.

Figure 14:
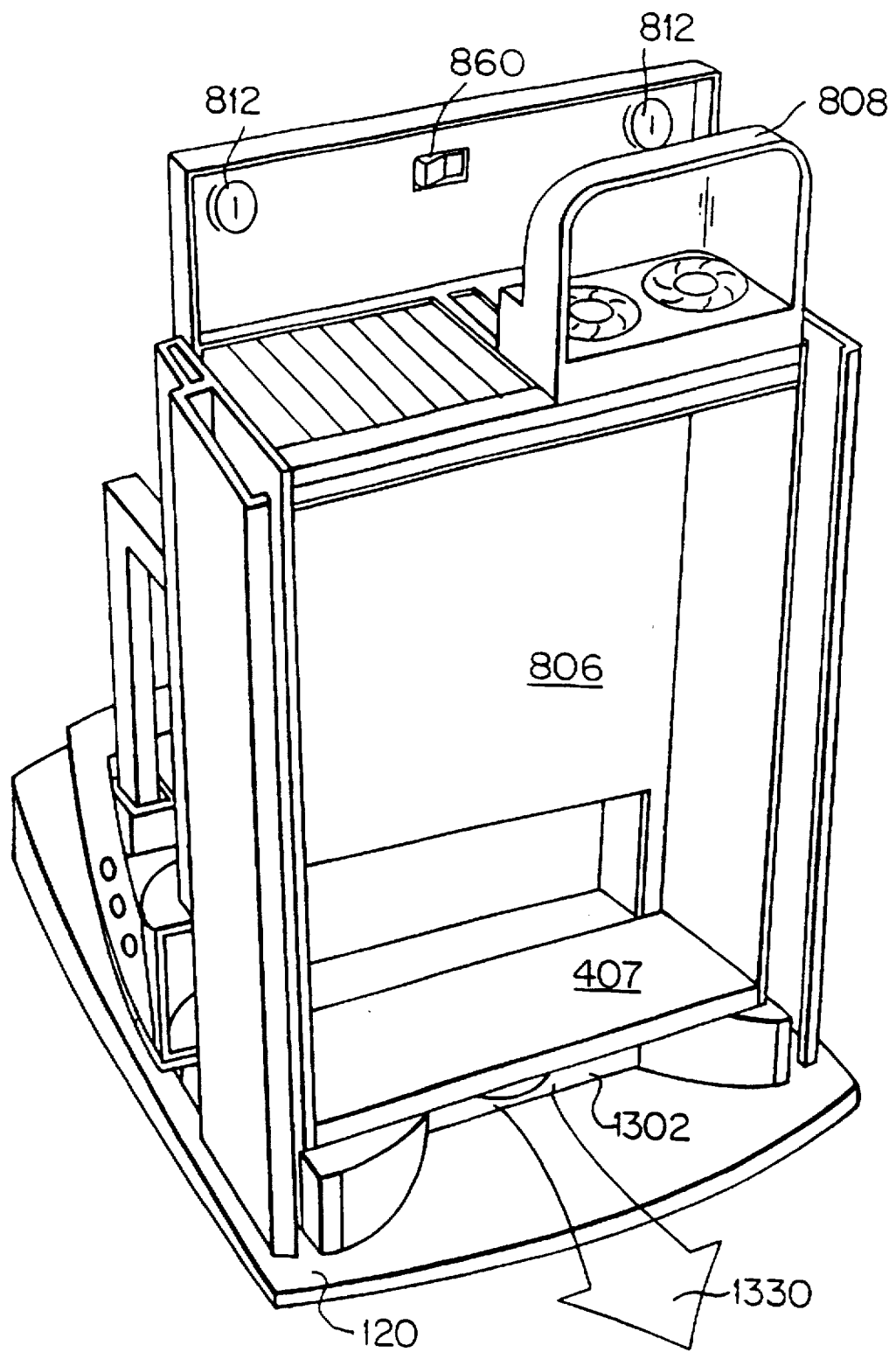
FIG. 14 is a perspective back view of the computer system showing air circulation for the power supply.

FIG. 14 is a perspective back view of the computer system with casing 102, cable cover 110, PCBs 412, and back 304 removed. Once the air has passed over power supply 408, it is passed from the system through fan 704. A partition 407 serves to separate the air output from fan 704 from the air circulation area 806, which contains air used to cool the PCBS. FIG. 14 also shows an ON/OFF switch 860 for computer system 100 and two locks 812, which are discussed below in connection with FIG. 18.

d. The Internal and the Externally Accessible Peripheral Devices

Figure 15:
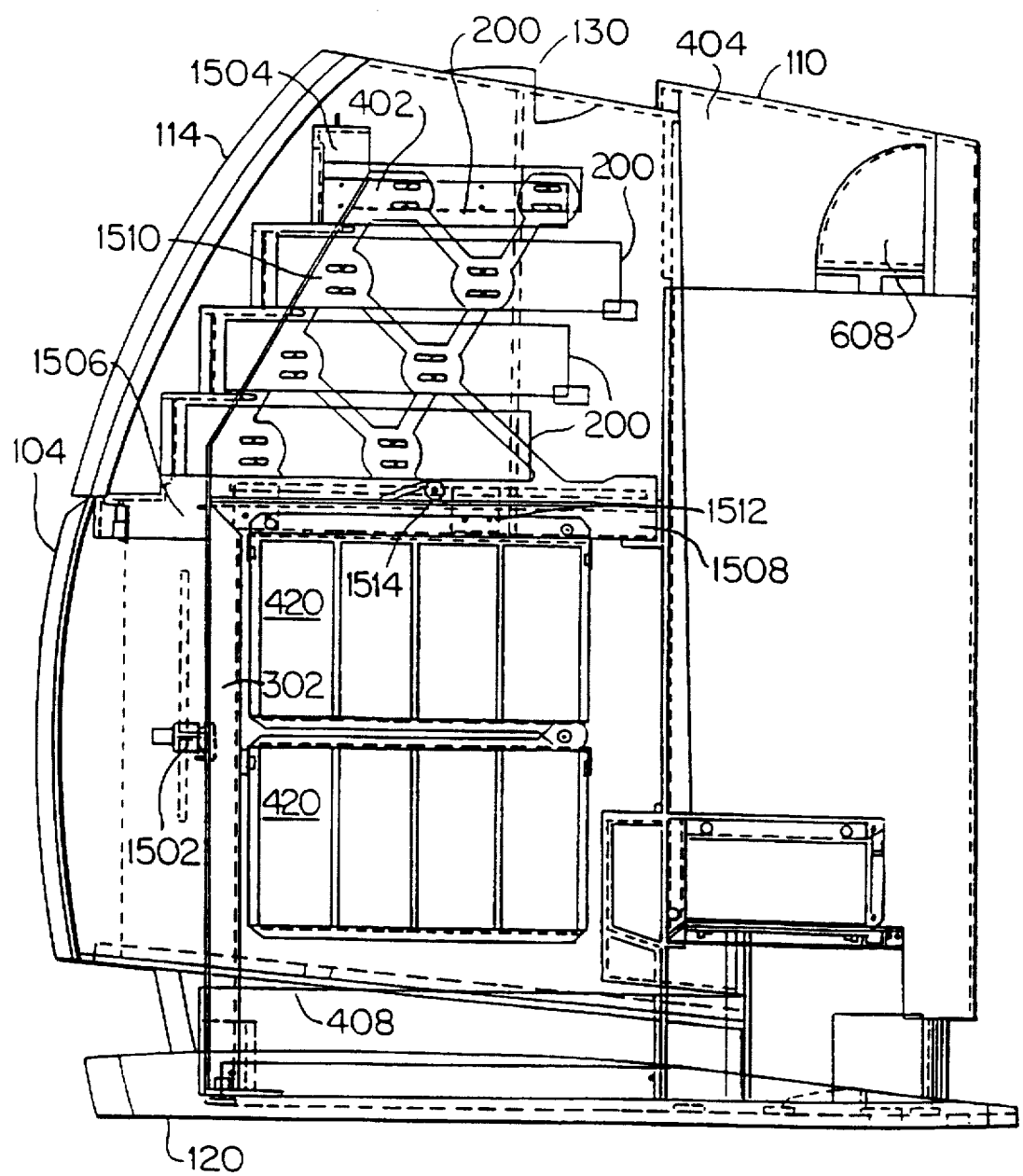
FIG. 15 is a side view of the computer system including an outline of the exterior casing, showing an arrangement of internal peripheral devices and of externally accessible peripheral devices, and showing the externally accessible peripheral devices in a locked position.

FIG. 15 is a side view of computer system 100, including an outline of the exterior casing, showing an arrangement of internal peripheral devices 420 and of externally accessible peripheral devices 200, and showing externally accessible peripheral devices 200 in a locked position. Externally accessible peripheral devices 200 are arranged in a stepped configuration that follows a curvature of the casing sides 106 and 107, and a curvature of door 114. Externally accessible peripherals 200 are mounted on lattice-shaped frame 402. Frame 402 includes two side brackets 1510 (one on either side of peripherals 200). The top and bottom peripherals 200 stabilize frame 402. The peripherals 200 and side brackets 1510 act together to provide stability to frame 402.

Lattice-shaped frame 402 is mounted on rails 1508 (one rail one either side of frame 402) that allow all of the peripherals 200 to slide forward together along the top of supporting L-brackets 1302. Peripherals 200 slide forward when a user pulls the peripherals forward and lifts lock 1514. The frame 402, including peripherals 200, slides forward until stop 1512 reaches the front of the L-bracket. The lattice slides back and locks in place via lock 1514. Opening door 114, as described below, gives external access to peripherals 200.

Figure 16:
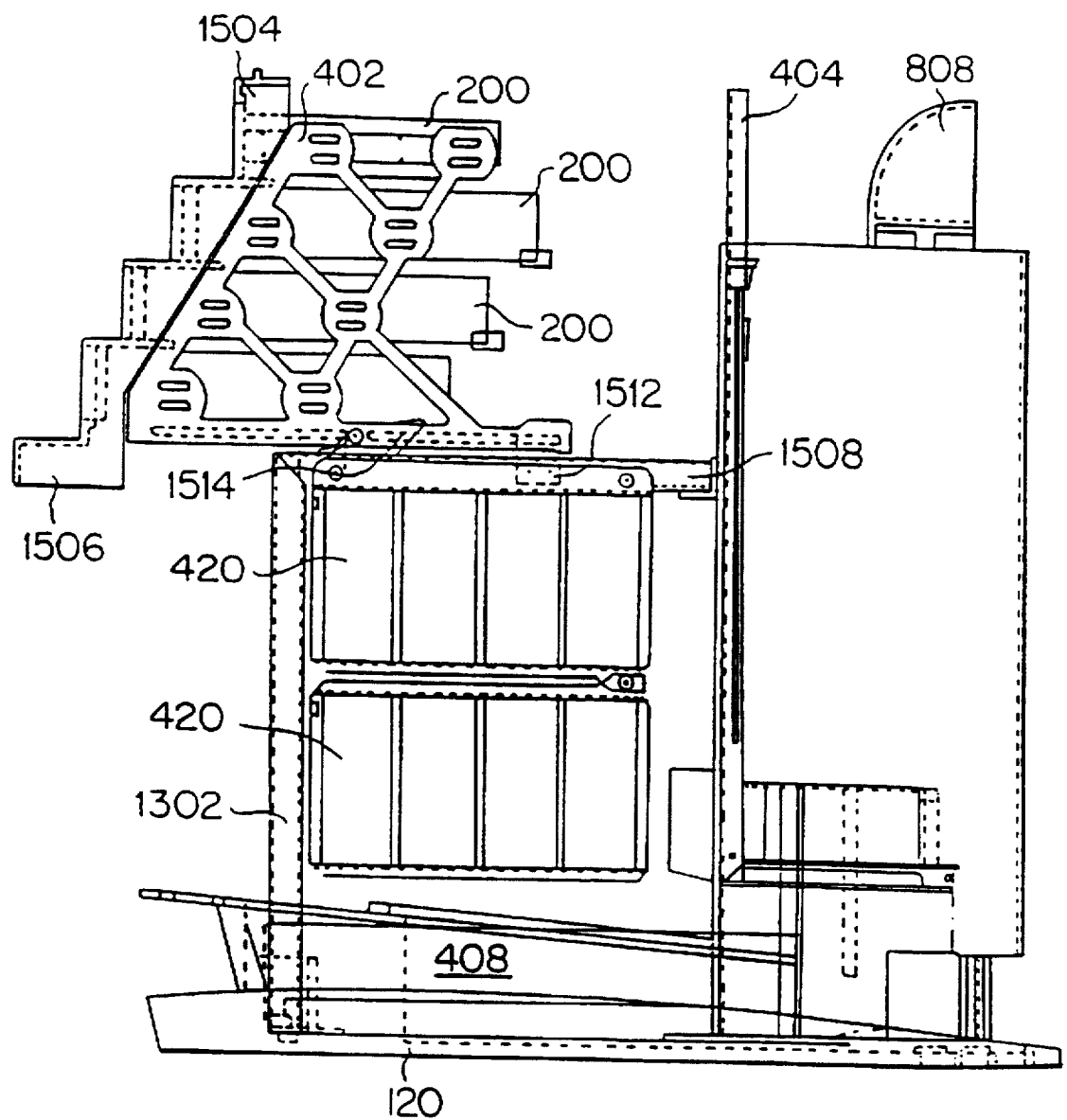
FIG. 16 is a side view of the computer system of FIG. 15, excluding the exterior casing, showing the externally accessible peripheral devices in a forward position.

FIG. 16 is a side view of the computer system of FIG. 15, showing the externally accessible peripherals 200 in a forward position. Casing 102 (including door 114) must be removed before the peripherals 200 can be slid forward. The ability to slide externally accessible peripheral devices 200 forward allows easy access to peripherals 200 for upgrading of components and for repair and facilitates access to cables (not shown) emerging from the backs of the peripherals 200.

Figure 17:
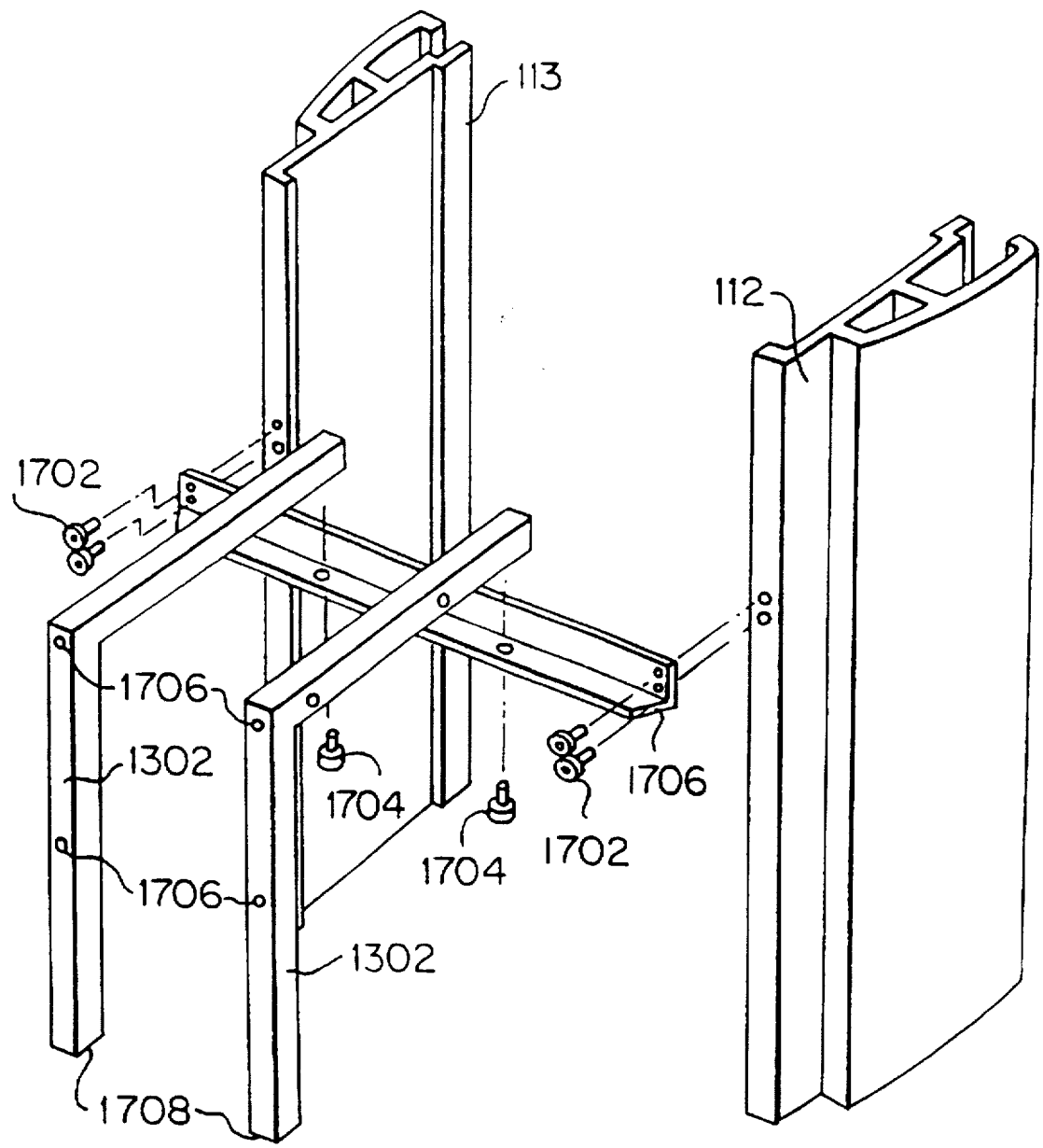
FIG. 17 is a perspective front view of structure used to mount the externally accessible peripheral devices and internal peripheral devices on a side of a card cage of the computer system.

FIG. 17 is a perspective front view of structure used to mount the externally accessible peripheral devices and internal peripheral devices of a side of the card cage of the computer system. FIG. 17 shows L-brackets 1302 mounted to an interior wall of the card cage. Fasteners 1702, e.g., screws, connect a brace 1706 to card cage sides 112 and 113. Fasteners 1704, e.g., screws, connect L-bracket 1302 to brace 1706. In another embodiment, L-brackets 1302 are welded in place or attached using any suitable means. An end 1708 of each L-bracket 1302 is secured in a respective one of square braces 1220, which are integral to base 120 (see FIGS. 8 and 12).

Figure 18:
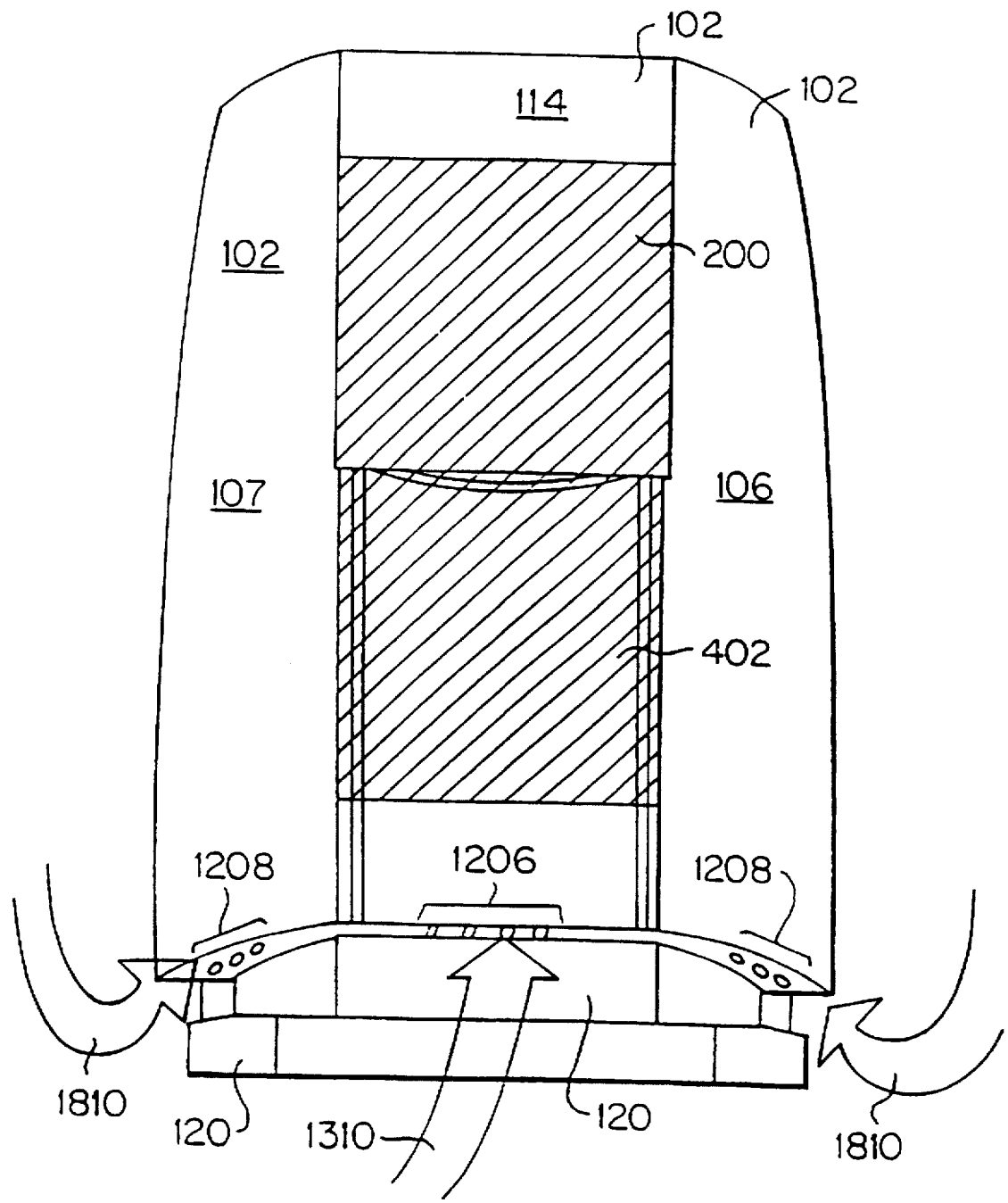
FIG. 18 is a front view of the computer system of FIG. 1, showing air circulation for the internal peripheral devices and the externally accessible peripheral devices.

FIG. 18 is a front view of the computer system of FIG. 1, showing air circulation for the internal and external peripheral devices. The shape of casing 102 allows for a relatively large volume of air to surround the internal peripheral devices 420 and the externally accessible peripheral devices 200. Casing 102 is constructed so that it can be removed in a single step. Casing 102 is secured in place by one or more key locks 812 located on the top, rear of the system 100. A pair of locks 812 preferably are located underneath cable cover 110, as shown in FIG. 8. In a preferred embodiment of the system, the two locks 812 are opened with different keys. If these keys are held by different persons or are stored separately, the security of the system is improved. Casing 102 is replaced by sliding the casing towards the back of system 100, while resting weight on base 120, until the casing 102 comes to rest against the card cage.

Figure 19:
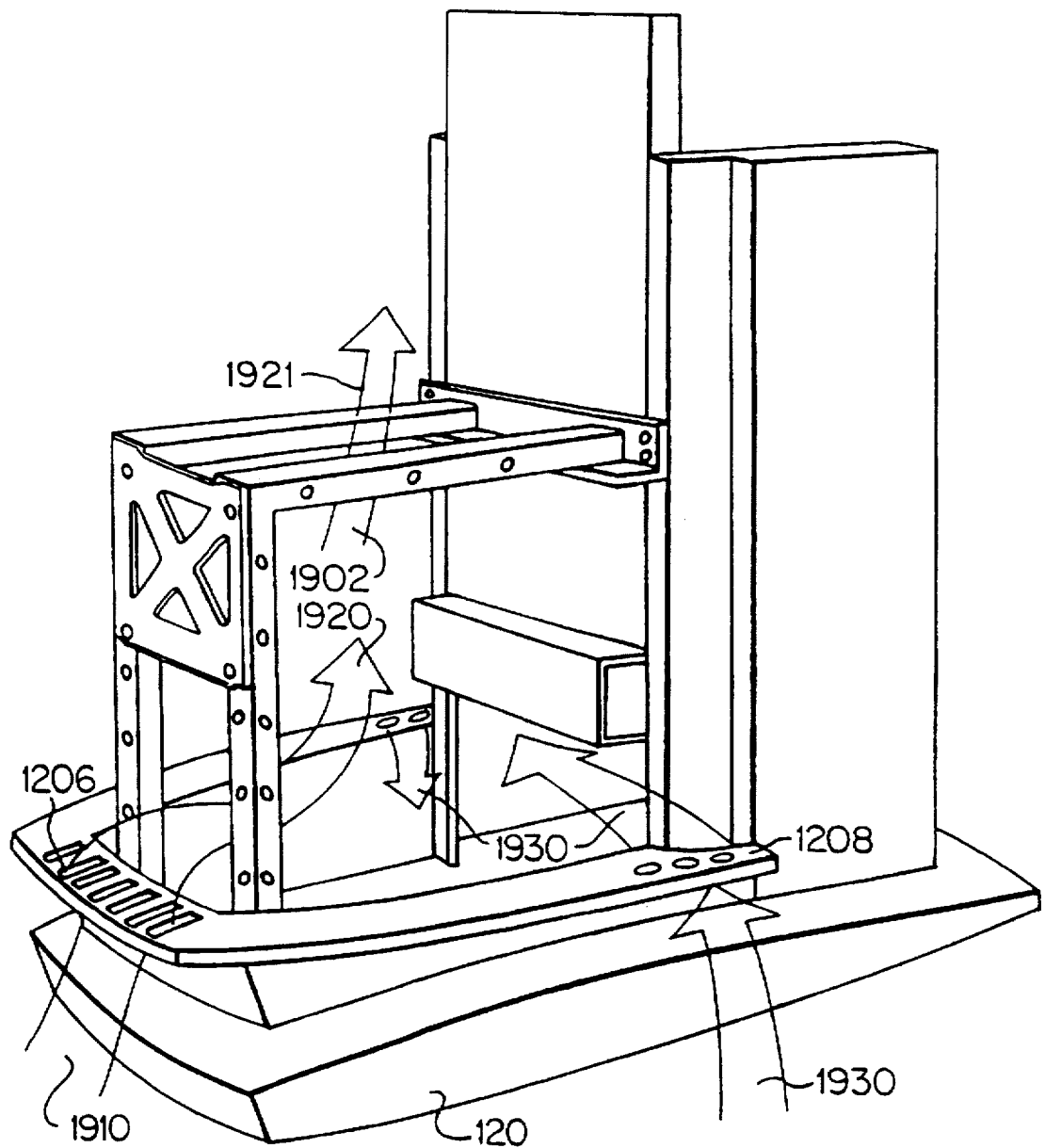
FIG. 19 is a perspective front view of the computer system of FIG. 18 with the casing removed, showing air circulation for the internal peripheral devices and the externally accessible peripheral devices.

FIG. 19 is a perspective front view of the computer system of FIG. 18 with the casing removed, showing air circulation for the internal and external peripheral devices. Air rises naturally through vents 1206 into an air circulation area 1902 defined by the interior of casing 102 (not shown) and by base 120 in a direction indicated by arrows 1910, 1920, 1921, and 1930. The amount of air surrounding the internal and externally accessible peripherals 220 and 240 has a cooling effect on the peripherals.

e. The Door

Figure 20:
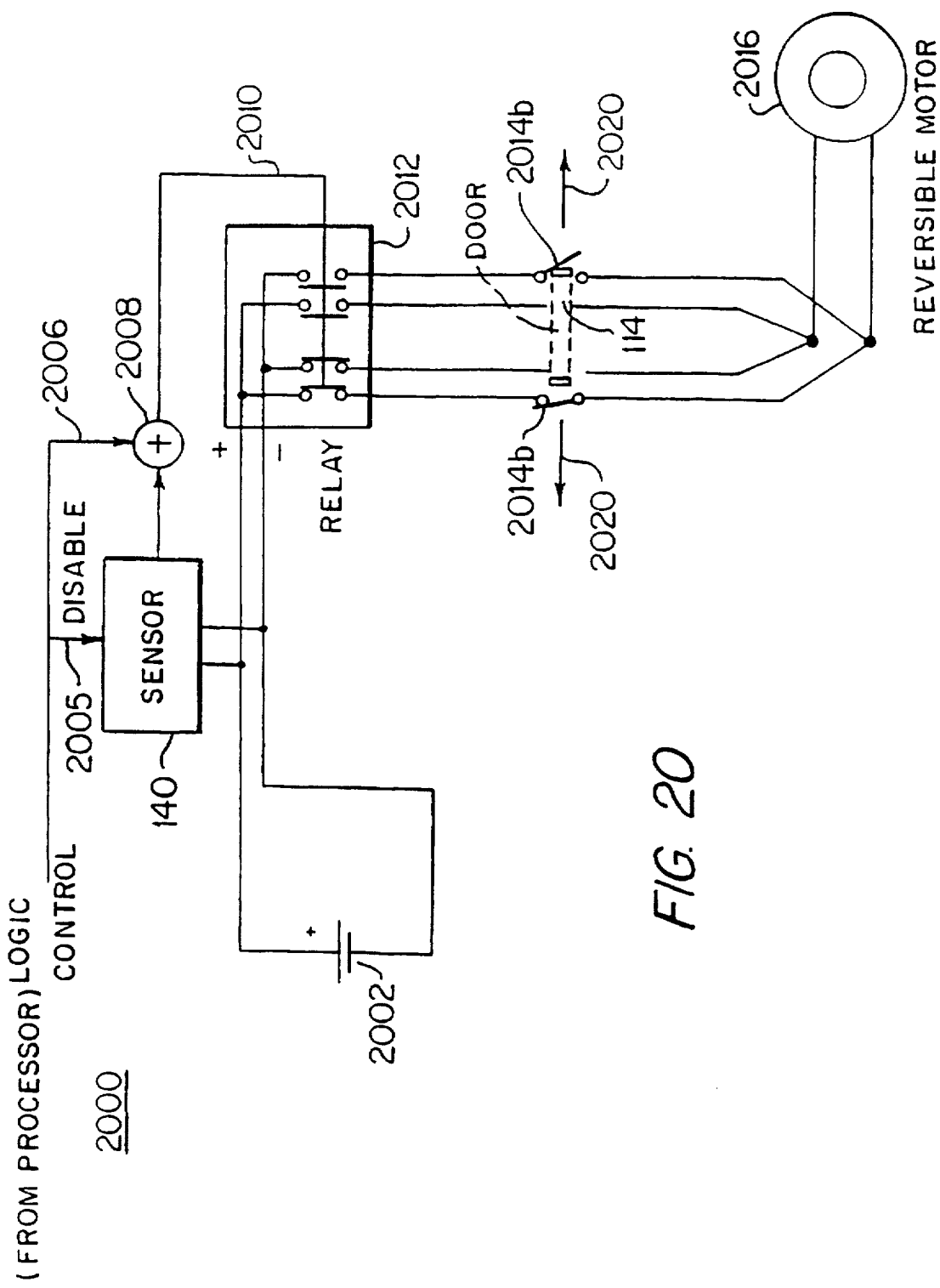
FIG. 20 is an electrical diagram describing an operation of the door.

FIG. 20 is an electrical diagram of a circuit 2000 for controlling an operation of door 114. FIG. 20 includes a DC power supply 2002, sensor 140 (see FIG. 1), a sensor disable line 2005, a logic control line 2006, an OR operator 2008, a relay control line 2010, a double pole relay 2012, a plurality of door limit switches 2014a and 2014b, and a reversible motor 2016. Door 114 moves in the direction of arrows 2020 (up (closed) and down (open)). If, during operation, sensor 140 detects a predetermined condition indicating that the position of door 114 should be changed (open-to-closed or closed-to-open), then sensor 140 outputs a signal through element 2008 to relay control line 2010 and to relay 2012. In response to the received signal, relay 2012 toggles and changes a polarity and direction of rotation of motor 2016. The change in direction of motor 2016 causes door 114 to move in an opposite direction than it last moved, as discussed below in connection with FIGS. 20-24. When door 114 moves away from either of the limit switches 2014, the switch closes. When door 114 pushes either of the limit switches 2014, the switch opens. Thus, for example, when door 114 moves away from limit switch 2014a, limit switch 2014a closes. When door 114 reaches an end of its trajectory it pushes, e.g., limit switch 2014b open.

In a preferred embodiment, sensor 140 is a light sensitive sensor that detects when a light beam from an LED is reflected by, e.g., a person's hand passing in front of a light beam from the LED. Sensor 140 is shown in, e.g., FIG. 1. In another preferred embodiment, sensor 140 is a voice-activated sensor that responds to voice commands such as "open", "close", "lock", and "unlock". In yet another preferred embodiment, sensor 140 is a proximity switch. Sensor 140 can be any type of device that detects a predetermined condition and sends an appropriate signal to reversible motor 2016.

Relay 2012 is preferably a latching relay. The signal generated by sensor 140 activates the relay and the relay remains activated for a predetermined period of time, long enough for door 114 to complete its trajectory. Thus, door 114 always moves from completely open to completely closed, or vice versa. Another embodiment uses a relay that is not latching relay. In this case, the control signal from sensor 140 or from the processor must remain applied to relay 2012 long enough for door 114 to complete its trajectory.

Switches 2014a and 2014b are located at either extremes of the trajectory of door 114, such that when door 114 reaches its top (or bottom) limit, door 114 physically forces the respective switch open, removing power from the door. The relay 2012 provides a second circuit to bypass whichever limit switch is open.

As shown in FIG. 20, door 114 can also be controlled by a processor of the system. Such a processor may be located, e.g., on one of PCBs 412. The processor may be dedicated to the task of controlling door 114 or may perform many tasks other than control of door 114. Various embodiments of the invention may implement different priorities for signals from sensor 140 and from the processor without departing from the scope of the present invention.

Figure 21:
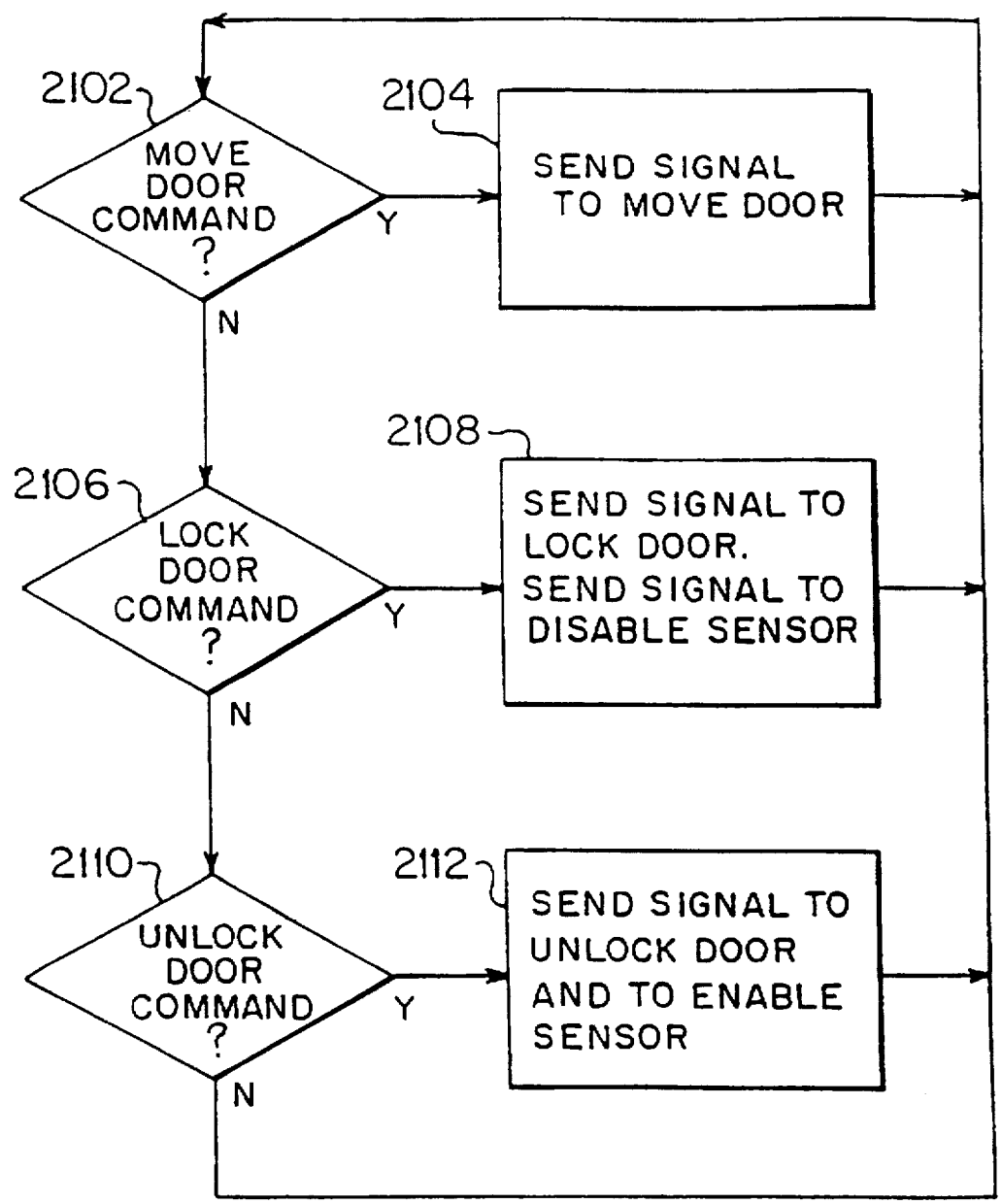
FIG. 21 is a flowchart describing steps performed by a processor of the system to receive door control commands from a user.

FIG. 21 is a flowchart 2100 of a process performed by a processor of the system to control operation of door 114. In the described embodiment, a user has the option to enter commands to control the operation of door 114 using a keyboard or similar input device (not shown) of computer system 100. In step 2102, the processor checks an entered command to determine if the command is a command to move door 114. If the command is a "move door" command e.g., "open" or "close", then the processor sends a signal on line 2006 of FIG. 20 to relay 2012 to cause door 114 to move. Otherwise, processing continues with step 2106. In a preferred embodiment that does not implement "lock" and "unlock" commands, only steps 2102 and 2104 are performed by the processor. In other embodiments that implement the "lock" and "unlock" commands, the processor also performs steps 2106 through 2112.

In step 2106, the processor checks an entered command to determine if it is a lock command, which indicates that door 114 should be "closed." If a lock command is detected, the processor sends a signal on line 2006 to relay 2012 to cause door 114 to lock and a signal on line 2005 to disable output from sensor 140 until an unlock command is entered. Otherwise, processing continues with step 2110.

In step 2110 the processor checks an entered command to determine if it is an unlock command. If the command is an unlock command, then the processor sends a signal on line 2006 to relay 2012 to cause door 114 to unlock and signal 2005 to enable sensor 140. If no move door, lock or unlock command is detected in steps 2102, 2106, and 2110, control returns to step 2102.

Figure 22:
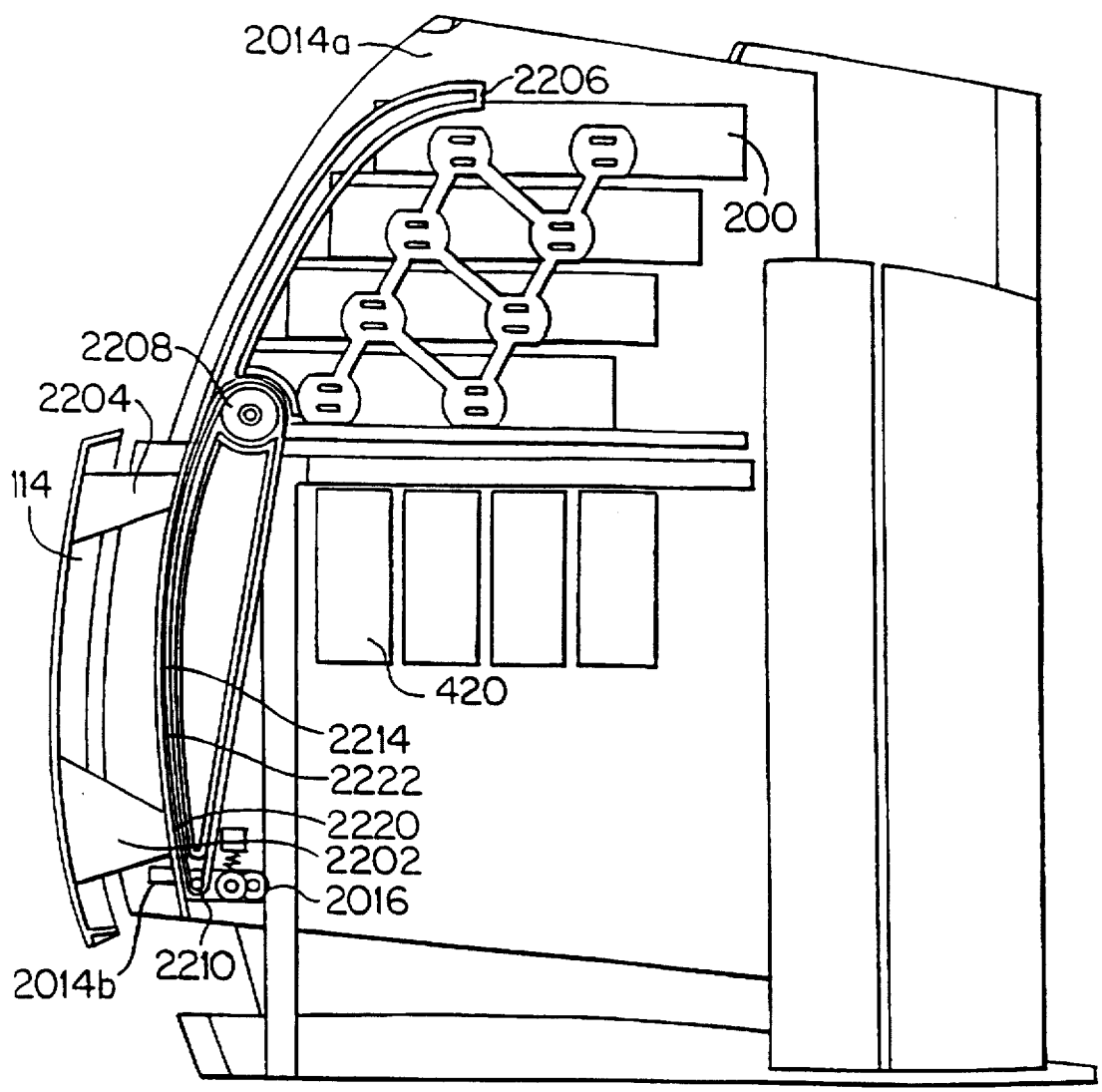
FIG. 22 is a side view of the door mechanism with the door open.

FIG. 22 is a side view of the system, showing door 114 in an open position. In the open position, a bottom support 2202 of door 114 is engaged with a track 2222. Support 2202 is fixed at a location 2220 to a belt 2214. One or more motors 2016 turn a lower wheel 2210 and an upper wheel 2208. Belt 2214 is stretched between wheels 2208 and 2210, and rotates as the wheels rotate.

As belt 2214 rotates, support 2202, which affixed to belt 2214 also moves. As shown in FIG. 22, when point 2220 is near a bottom point of belt 2214, door 114 is pulled downward into an open position. Upper support 2204 is slidably attached to track 2222 and follows the motion of lower support 2202. In the open position, door 114 is spaced apart from casing 102 of the system in a horizontal direction, and is held in this spaced position by rigid supports 2202 and 2204.

Figure 23:
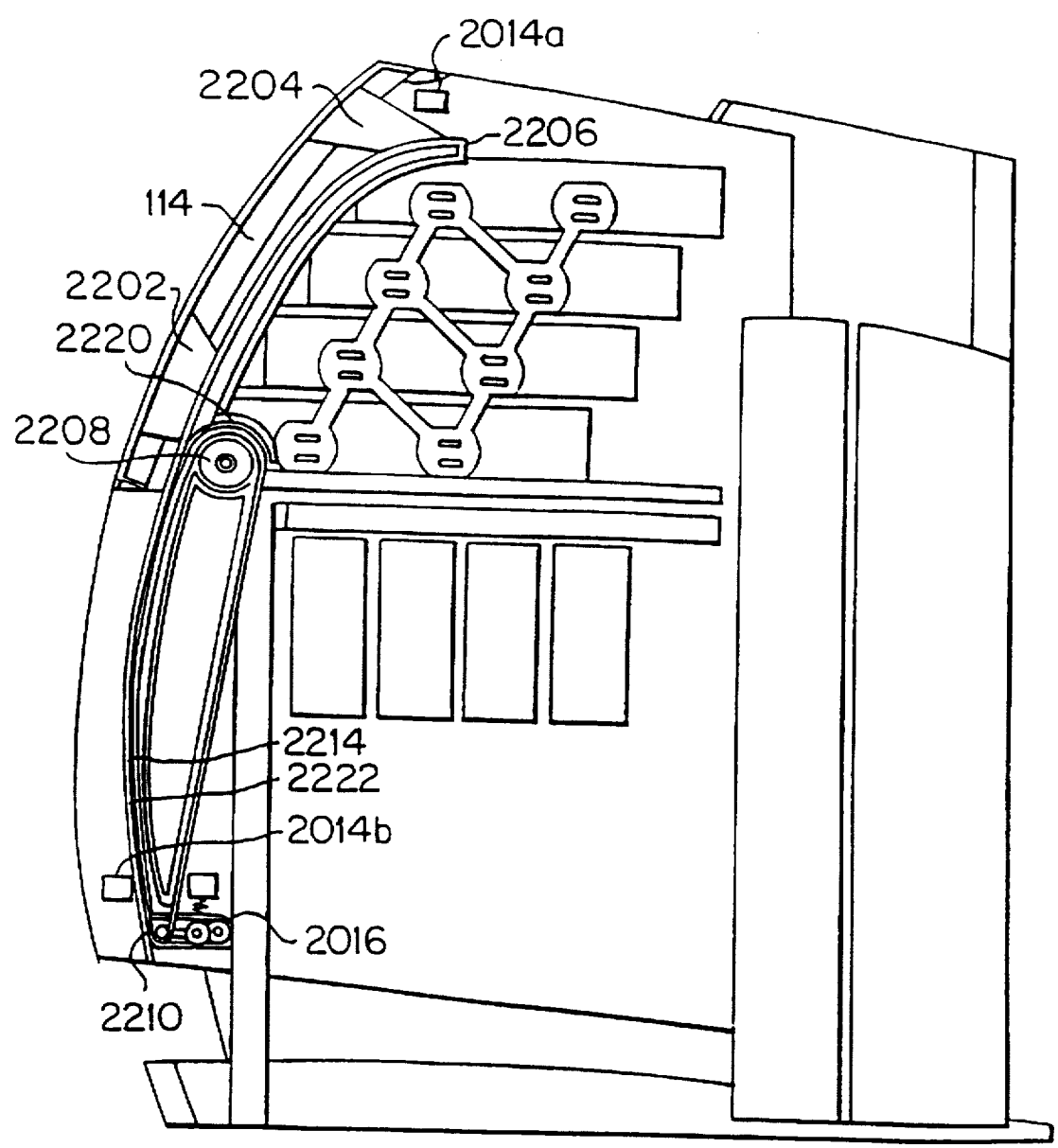
FIG. 23 is a side view of the door mechanism with the door closed.

FIG. 23 is a side view of the system, showing door 114 in a closed position. In the closed position, bottom support 2202 and top support 2204 of door 114 are slidably engaged with track 2222.

To move from the open position to the closed position, belt 2214 is rotated upwards, and support 2202, which is affixed to the belt also moves upwards. As shown in FIG. 23, when point 2220 is near a top point of belt 2214, the door is pushed upward into a closed position. Upper support 2204 is slidably attached to track 2222 and follows the motion of lower support 2202. FIG. 23 shows that door 114 is flush with the front 104 of casing 102 in the closed position.

To move from the closed position to the open position, belt 2214 is rotated downwards, and support 2202, which is affixed to the belt also moves downwards. Thus, reversible motor 2016 moves belt 2214 in opposite directions to open and close door 114.

Figure 24:
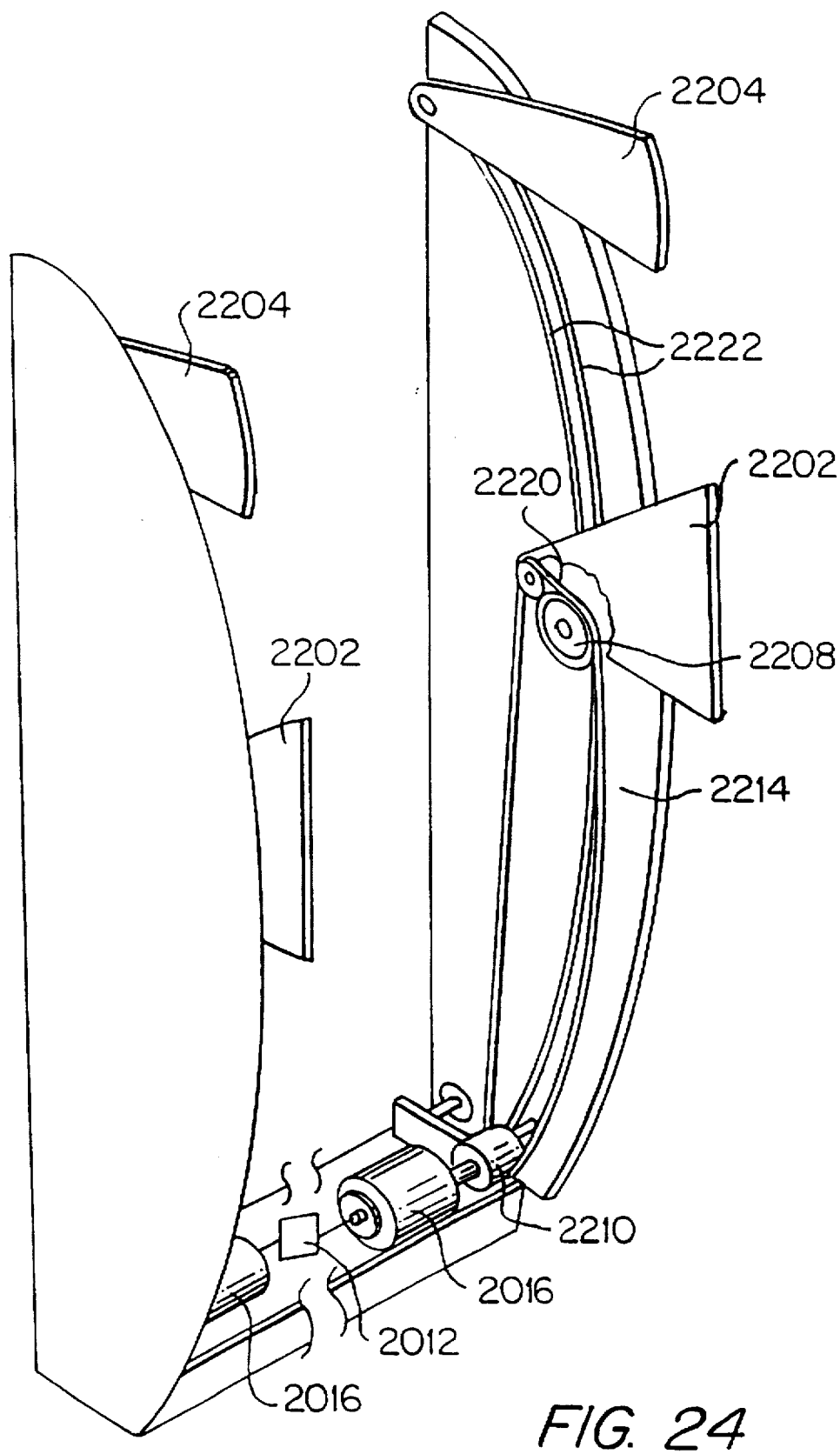
FIG. 24 is a perspective front view of a detail of the mechanism of FIG. 21.

FIG. 24 is a front perspective view of details of the mechanism of FIGS. 22 and 23. In FIG. 24, door 114 is omitted for clarity of explanation. FIG. 24 includes two motors 2016. Other embodiments use only a single motor or a plurality of motors, respectively. FIG. 24 also shows wheels 2208 and 2210, belt 2214, supports 2202 and 2204, and point 2220 on support 2202.

The following paragraph describes action occurring for one side of door 114. Similar actions occur on the other side of door 114. During operation, motor 2016 rotate a shaft that, in turn, rotates wheel 2210. As wheel 2210 rotates, belt 2214 also rotates and door 114 follows the motion of belt 2214, since point 2220 of support 2202 is affixed to belt 2214.

f. Cabling

Figure 25:
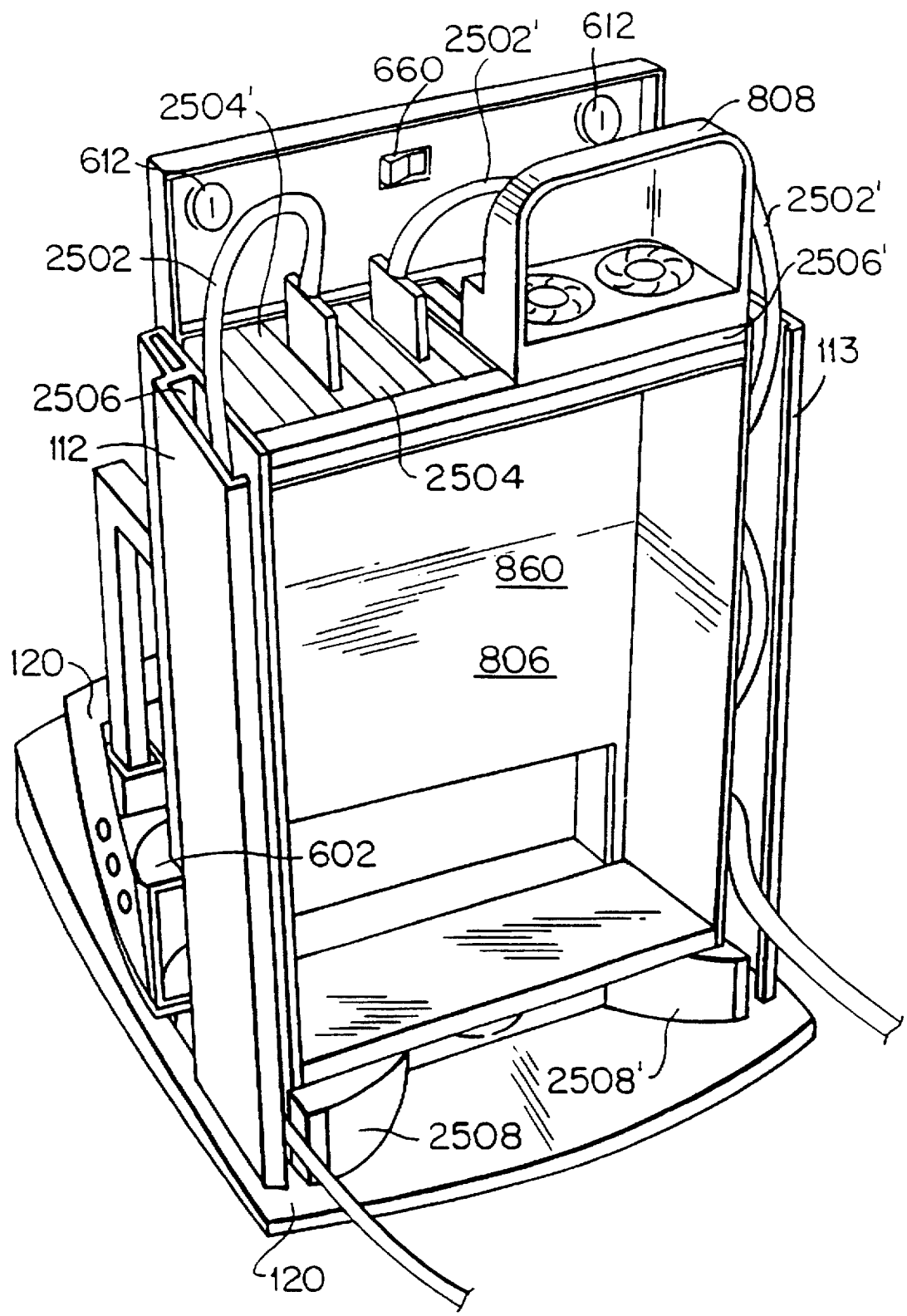
FIG. 25 is a perspective back view of the computer system showing a cabling arrangement in accordance with the present invention.

FIG. 25 is a perspective back view of the computer system showing a cabling arrangement in accordance with the present invention. In the described embodiment, PCBs 412 (not shown) are arranged vertically in area 860, such that all the cable connections for externally accessible cables, such as I/O cables, are located at a top, rear of the card cage enclosure 806, where they may be easily accessed by the user.

FIG. 25 shows PCB connectors 2504 and 2504' (the PCB itself is not shown in this figure). Other PCB connectors are located behind fan hood 808. A cable 2502 plugs into the connector 2504. Cable 2502 passes through a channel 2506 in side part 112 of the card cage and exits the channel near the ground. Bottom guides 2508 keep the cable aligned in a direction away from the computer system. Although not shown, more than one cable can pass though channel 2506. A second channel 2506', located in side 113, can also contain one or more cables. Channels 2506 keep the cables therein organized and contain stops (not shown) to keep the cables within the channels. The channels also provide strain relief for the cables, so that, e.g., a cable disturbed on the ground will not be disconnected from connector 2504 at the top of the card cage enclosure 806.

Figure 26:
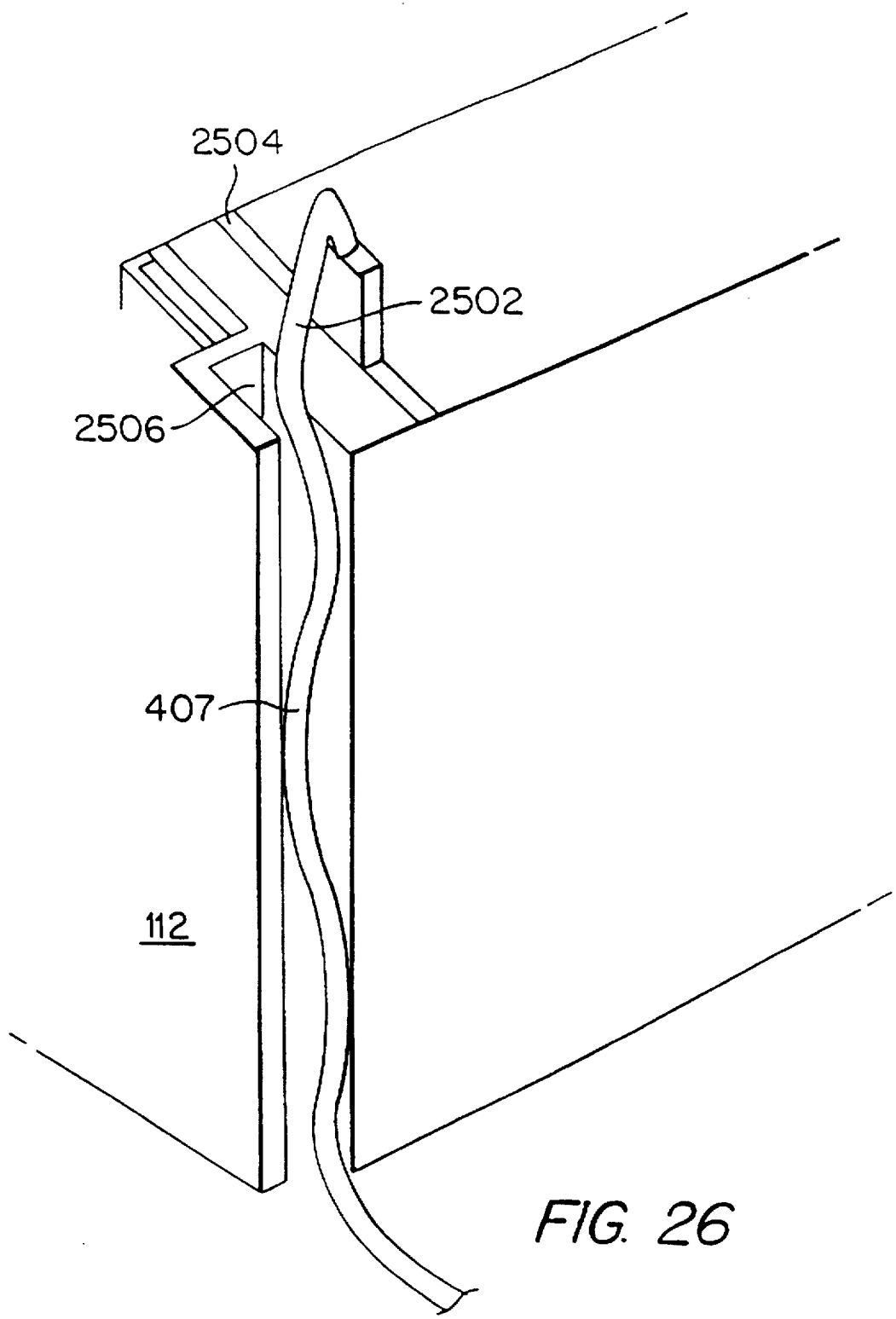
FIG. 26 is a diagram of a detail of FIG. 25.

FIG. 26 is a diagram of a detail of FIG. 25. FIG. 26 shows a curved path 2602 (also called a "tortuous path" or a "serpentine path") in side 112 (or 113) that makes it even more difficult to pull cable 2502 from within channel 2506.

g. Additional Embodiments

Figure 27:
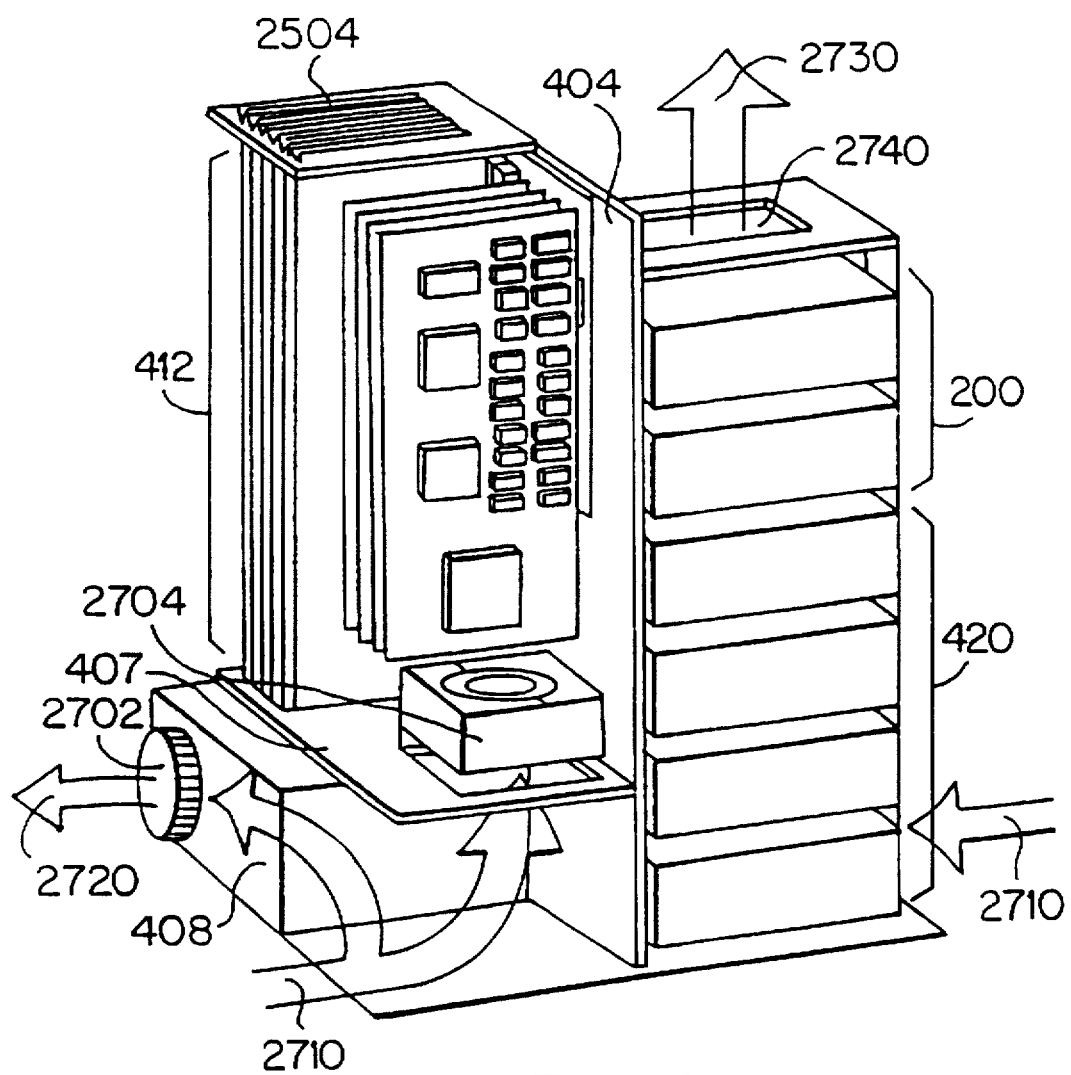
FIG. 27 is a perspective view showing an arrangement of internal elements of another preferred embodiment of the present invention showing air circulation for printed circuit boards, peripheral devices, and a power supply.
Figure 28:
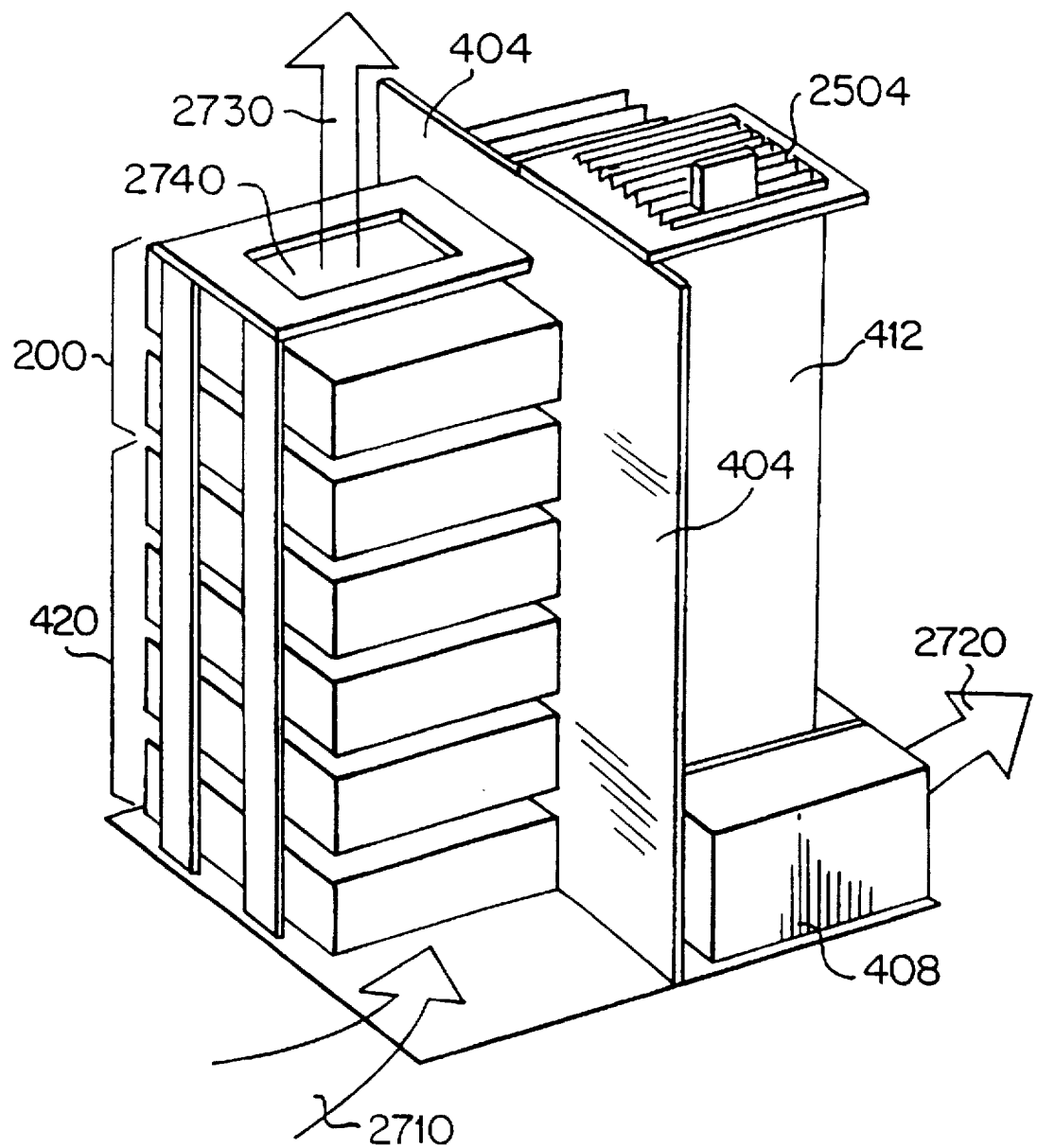
FIG. 28 is another perspective view of the embodiment of FIG. 27.

FIGS. 27 and 28 show another embodiment of the invention. FIG. 27 is a perspective view showing an arrangement of internal elements of another preferred embodiment of the present invention showing air circulation for printed circuit boards, peripheral devices, and a power supply. FIG. 28 is another perspective view of the embodiment of FIG. 27.

In FIGS. 27 and 28, air enters a vent in casing 102 (not shown), in a direction indicated by arrow 2710 and is drawn in two directions by a fan 2702 and a fan 2704, respectively. Air passes over and through power supply 408 and is drawn out of system 100 by fan 2702 in a direction indicated by arrow 2720. Air passes through an opening in card cage bottom 407 and is drawn upward by fan 2704 into the area surrounding PCBs 412 to produce a cooling effect.

FIG. 28 shows another view of the system of FIG. 27. As indicated by arrow 2710, air rises into a peripherals area from outside the system through an opening or vent in the casing and rises through the top of the peripherals area.

Although the embodiment of the present invention shown in the Figures uses a single-sided backplane, other configurations of backplanes and PCBs can be used with the invention. For example, the invention may incorporate double sided backplanes.

In another embodiment of the invention, the air circulation area surrounding the power supply is a separate modular unit, and the enclosure surrounding power supply 408 is not formed exclusively by the peripherals and/or partitions below the PCBs, as described herein.

Figure 29:
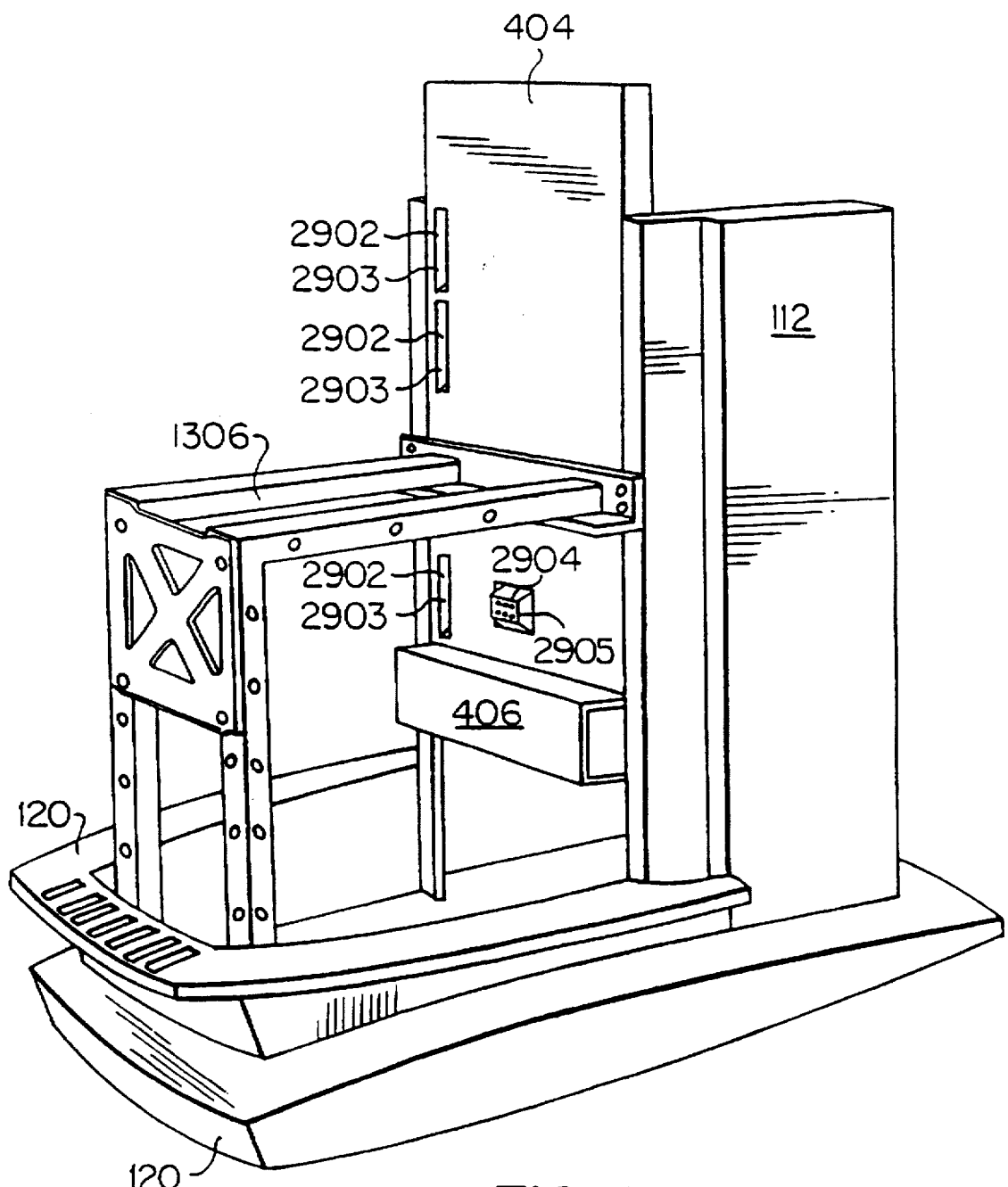
FIG. 29 is a front perspective view showing openings for connectors through a back of the card cage.
Figure 30:
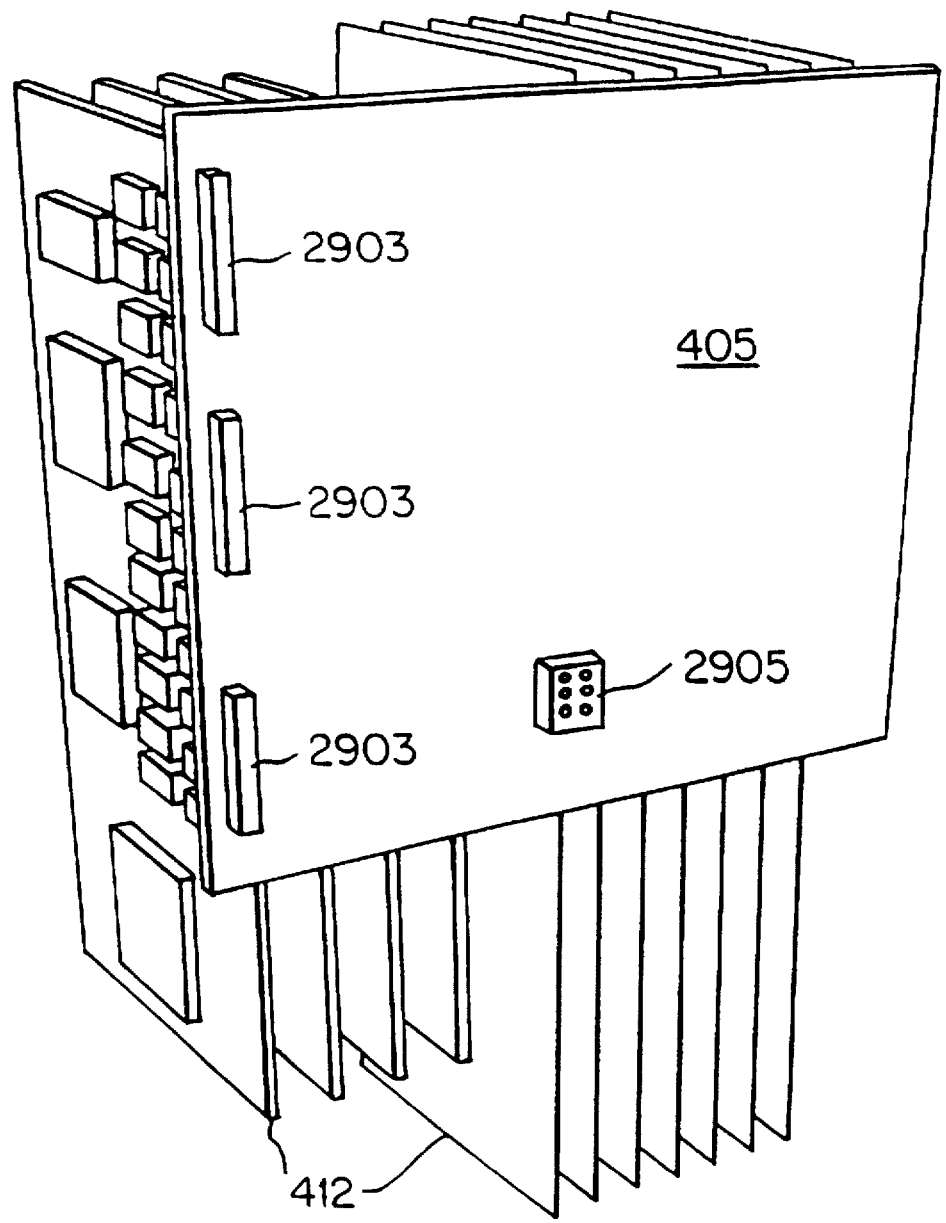
FIG. 30 is a front perspective view showing the connectors of FIG. 29 attached to a back of the backplane.

FIG. 29 is a front perspective view showing openings for connectors through a back of the card cage. Slots 2902 and 2904 are cut out from card cage back 404, allowing connectors 2903 and 2905 mounted on the backside of backplane 405 to be fed through card cage back 404. Use of slots 2902 and 2904 reduces a number of cables that have to be routed inside the card cage. In conventional systems, cables inside the card cage may pick up electromagnetic radiation and may conduct the radiation out of the card cage. Slots 2902 and 2904 eliminate and/or reduce this problem. Slots 2902 and 2904 also facilitate plugging in cables from peripherals 200 and 420, power supply 408, etc. into connectors 2903 and 2905. In FIG. 29, connectors 2903 are flat cables connectors (for the peripherals 200 and 420) and connector 2905 is a wire mounted cable (for power supply 408). Other types of connectors may also be used as required. FIG. 30 is a front perspective view showing the connectors of FIG. 29 attached to a back of backplane 405.

Figure 31:
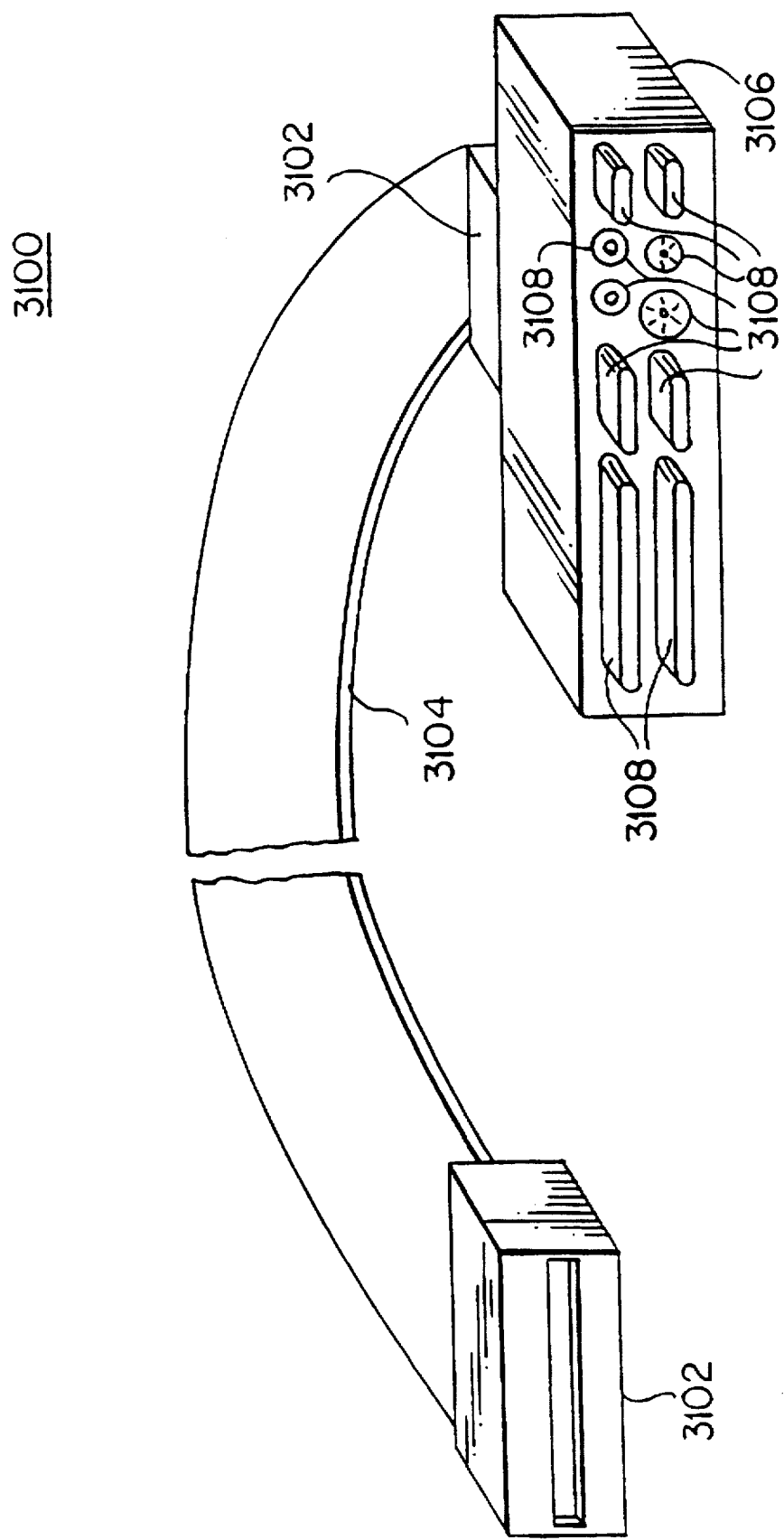
FIG. 31 shows a remote interconnect module of the present invention.

FIG. 31 shows a remote interconnect module 3100 of the present invention. Remote interconnect module 3100 provides a "universal" connector 3102 for computer system 100 that allows the computer system 100 to connect to one or more of a plurality of industry standard connectors at the same time. Connector 3102 is a high density connector of a type shown in, e.g., U.S. appl. Ser. No. 08/208,877 to Stanford W. Crane, Jr. et al. entitled MODULAR ARCHITECTURE FOR HIGH BANDWIDTH COMPUTERS and U.S. appl. Ser. No. 07/983,083, to Stanford W. Crane, Jr. entitled HIGH-DENSITY ELECTRICAL INTERCONNECT SYSTEM. The high density connector has a density of at least 100 contacts per linear inch.

In a preferred embodiment of the present invention, I/O is handled by having a plurality of different industry standard connectors on PCBs 412. In another embodiment, I/O is handled by attaching connector 3102 to one of PCBs 412, as described below.

Figure 32:
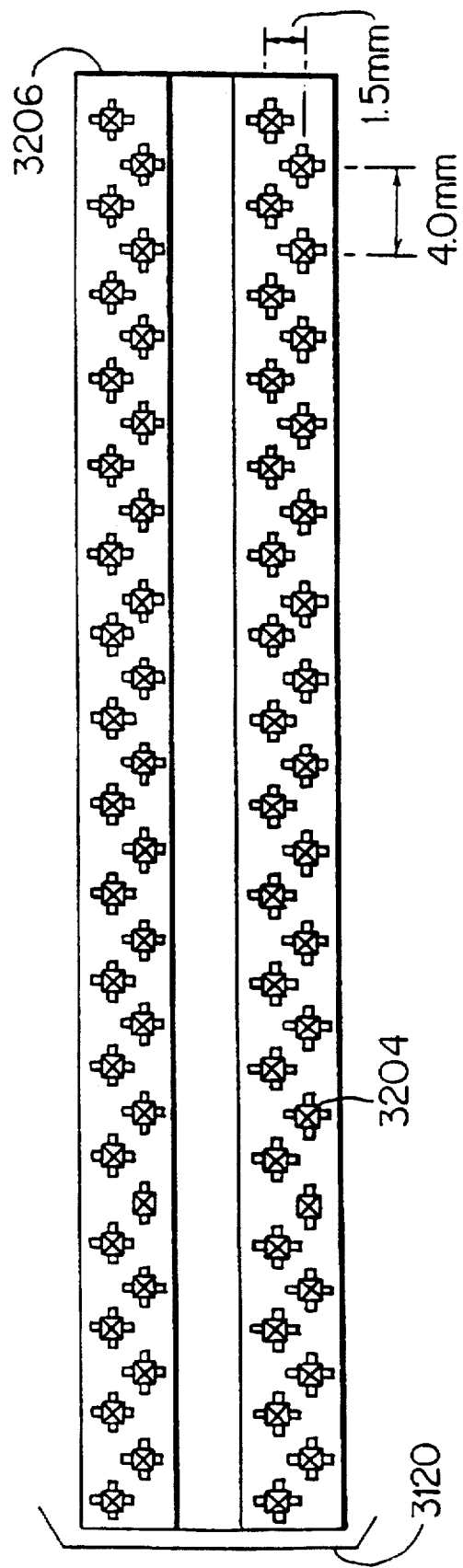
FIG. 32 shows an exemplary detail of a connector of FIG. 31.

FIG. 32 shows an exemplary detail of connector 3102. Connector 3102 connects to computer system 100 through one of connector plugs 2504 in a manner shown in FIG. 25. Connector 3102 can be either a male or a female connector. In connector 3102, contacts are arranged in groups of four, called clusters 3204. Each cluster has a center "posts," with four "beams" arranged around the posts. In general, several factors affect how closely the clusters can be placed on connector 3102. For instance, cluster spacing is affected by how closely holes for the posts can be formed in an insulator. The cluster spacing must also allow room for the beams to spread upon mating and yet not touch each other. In addition, the cluster spacing must allow room to mount traces on the PCB.

Connector 3102 has two groups 3206 of two staggered (interlaced) rows of clusters 3204. Connector 3102 plugs into corresponding connector 2504, which has two groups of two rows of staggered clusters mounted on each side of a PCB. Each cluster has four contacts. Connector 3102, as shown in FIG. 32, has a density of approximately 100 contacts per linear inch ((25.4 mm in one inch/4 mm between center of clusters)×2 rows×2 sides of the PCB= approximately 100). If for example, a third row was added to each of the two rows in connector 3102, the density would increase to approximately 152 contact per linear inch. Another embodiment of the present invention has 3 mm between the center of the clusters.

Connector 3102 preferably has at least 132 contacts, which are sent over a cable 3104 to a remote box 3106. Cable 3104 may be a flat cable, a multi-strand round cable, or any other suitable type of cable. Remote box 3106 contains multiple connectors 3108 of different sizes and types. In a preferred embodiment, one or instances of one or more of the following buses may be contained in remote interconnect module 3100: a parallel port, a serial port, a SCSI port, an Ethernet port, a keyboard port, a mouse port, a video port, an audio port, and a telephone jack. Remote module 3100 may also connect to a DC power supply input, thus replacing power supply 408 with a remote source of DC power.

h. Summary

The present invention incorporates structure that partitions the computer into a plurality of air circulation areas. Such air circulation areas allow more control over the cooling of the computer system. Some of the components that serve to separate the interior of the system into air circulation areas also act as an EMI shield. In addition, the invention allows externally accessible peripherals, such as disk drives, to be moved into a position that facilitates access to the peripherals for upgrade or repair.

The modularity of the system also allows for ease of upgrades and repair. For example, the PCBs are easily accessible from the back of the system and the casing may be slid forward and removed for ease of access to the peripherals. The invention also includes an automatically activated door that opens to reveal, e.g., the externally accessible peripherals. Various hardware and software locks allow the system to be made secure. A remote interconnect module allows the system to easily connect to a variety of buses and I/O ports.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A computer system having a door mechanism connected to an outer casing of the computer system and covering an opening in the casing, comprising:

a door for sliding relative to the casing to cover and uncover the opening in the casing, the door having a shape to correspond to an arc of the casing;

sensing means for sensing a user's indication that the door should be moved; and means, connected to the indicating means and to the door, for slidably moving the door relative to the opening in the casing to cover and uncover the opening.

2. The computer system of claim 1, wherein the sensing means includes means for sensing that the door should be opened, and wherein the moving means includes means for sliding the door downwards to expose the opening in the casing.

3. The computer system of claim 1, wherein the sensing means includes means for sensing that the door should be locked, and further comprising means for locking the door in accordance with the sensing means.

4. The computer system of claim 3, wherein the sensing means includes means for sensing that the door should be unlocked, and further comprising means for unlocking the door in accordance with the sensing means.

5. The computer system of claim 3, wherein the sensing means includes means for sensing that the door should be closed, and wherein the moving means includes means for sliding the door upwards to expose the opening in the casing.

6. The computer system of claim 1, wherein the computer system further includes an externally accessible peripheral device behind the opening in the casing.

7. The computer system of claim 1, wherein the sensing means includes a proximity sensor.

8. The computer system of claim 1, wherein the sensing means includes a voice sensor.

9. The computer system of claim 1, wherein the moving means include a plurality of rails on the casing and corresponding portions of the door that fit within the rails.

10. A computer system comprising:

an exterior casing having an aperture;

a door slidable relative said exterior casing to open and close the aperture of said exterior casing;

a control circuit for generating a control signal for selectively controlling opening and closing of said door; and a motor drive mechanism, responsive to said control signal, for sliding said door along said exterior casing to open and close the aperture.

11. The computer system according to claim 10, wherein the aperture opens to at least one computer system peripheral device.

12. The computer system according to claim 10, wherein the aperture opens to at least one computer system disk drive.

13. The computer system according to claim 10, wherein at least a portion of said control circuit is mounted on said exterior casing.

14. The computer system according to claim 13, wherein said control circuit comprises a light-sensitive sensor.

15. The computer system according to claim 13, wherein said control circuit comprises a voice-activated sensor.

16. The computer system according to claim 13, wherein said control circuit comprises a proximity switch.

17. The computer system according to claim 10, wherein said control circuit comprises a computer system processor.

18. The computer system according to claim 10, wherein said motor drive mechanism comprises:

a reversible motor;

a first wheel mounted within said exterior casing;

a second wheel mounted within said exterior casing and spaced apart from said first wheel, wherein at least one of said first and second wheels is rotated by said reversible motor; and a belt mounted between said first and second wheels and coupled to said door, wherein said reversible motor rotates said at least one of said first and second wheels causing said belt to rotate about said first and second wheels and thereby slide said door along said exterior casing.

19. The computer system according to claim 18, wherein said control circuit comprises:

a first limit switch electrically coupled to said reversible motor and mounted within said exterior casing at a first extreme position of said door, wherein when said door reaches the first extreme position, said first limit switch controls said reversible motor to limit movement of said door; and a second limit switch electrically coupled to said reversible motor and mounted within said exterior casing at a second extreme position of said door, wherein when said door reaches said second extreme position, said second limit switch controls said reversible motor to limit movement of said door.

20. The computer system according to claim 18, wherein at least a portion of said door slides along a track positioned within said exterior casing.

21. The computer system according to claim 20, wherein said track defines an arcuate path.

22. A computer system comprising:

an exterior casing having an opening therein;

at least one peripheral device accessible to a user through said opening;

a door panel for slidably moving along said exterior casing to selectively cover and uncover said opening; and a track mounted adjacent said exterior casing wherein said door panel comprises supports for sliding within said track to cover and uncover said opening and wherein said track defines an arcuate path.

23. The computer system according to claim 22, wherein said supports further comprise top and bottom supports for sliding within said track to cover and uncover said opening.

* * * * *

UNITED STATES PATENT AND TRADEMARK OFFICE
CERTIFICATE OF CORRECTION

PATENT NO. : 5,781,408
DATED : July 14, 1998
INVENTOR(S) : CRANE, JR. et al.

It is certified that error appears in the above-identified patent and that said Letters Patent is hereby corrected as shown below:

Column 14, Line 7, change "claim 3" to --claim 1--.

Column 16, Line 6, insert a comma after "casing".

Signed and Sealed this

Ninth Day of February, 1999

Attest:

*Attesting Officer*

*Acting Commissioner of Patents and Trademarks*